US009762428B2

(12) United States Patent
Eastham et al.

(10) Patent No.: US 9,762,428 B2

(45) Date of Patent: Sep. 12, 2017

(54) IDENTIFYING AND ASSIGNING METRICS TO INFLUENTIAL USER GENERATED CONTENT

(71) Applicant: Bazaarvoice, Inc., Austin, TX (US)

(72) Inventors: Garrett Eastham, Austin, TX (US); Oliver Wong, Austin, TX (US); Andrew Chen, Austin, TX (US)

(73) Assignee: Bazaarvoice, Inc., Austin, TX (US)

(*) Notice: Subject to any disclaimer, the term of this patent is extended or adjusted under 35 U.S.C. 154(b) by 199 days.

(21) Appl. No.: 13/739,950

(22) Filed: Jan. 11, 2013

(65) Prior Publication Data

US 2013/0179794 A1 Jul. 11, 2013

Related U.S. Application Data

(60) Provisional application No. 61/585,430, filed on Jan. 11, 2012.

(51) Int. Cl.

| | |
|---|---|
| ***H04N 21/466*** | (2011.01) |
| ***G06Q 30/02*** | (2012.01) |
| ***H04L 29/08*** | (2006.01) |

(52) U.S. Cl.

CPC ........ *H04L 29/0809* (2013.01); *H04L 67/025* (2013.01); *H04L 67/22* (2013.01)

(58) Field of Classification Search

None

See application file for complete search history.

(56) References Cited

U.S. PATENT DOCUMENTS

| | | | | |
|---|---|---|---|---|
| 5,528,490 | A | 6/1996 | Hill | |
| 5,761,649 | A | 6/1998 | Hill | |
| 5,999,908 | A | 12/1999 | Abelow | |
| 6,029,142 | A | 2/2000 | Hill | |
| 6,236,994 | B1 | 5/2001 | Swartz et al. | |
| 6,608,615 | B1 * | 8/2003 | Martins | 345/156 |

(Continued)

OTHER PUBLICATIONS

Kelly et al., "Implicit feedback for inferring user preference: a biliography", Fall 2003, ACM SIGIR Forum, Volum 37 Issue 2, pp. 18-28.*

(Continued)

*Primary Examiner* — Matthew Ell

*Assistant Examiner* — Nhat-Huy T Nguyen

(74) *Attorney, Agent, or Firm* — Meyertons, Hood, Kivlin, Kowert & Goetzel, P.C.

(57) ABSTRACT

Techniques for collecting data indicative of one or more browsing behaviors (e.g., completing a transaction on a website) are described. User generated content (UGC) that affects user behavior may be identified, such as product reviews that, if read by a user, are statistically more likely to cause that user to make a purchase. A metric may be assigned to particular user generated content, where the metric indicates an extent to which the particular user generated content is associated with a particular browsing behavior. Based on the assigned metric, particular UGC may be included in a web page. For example, the product review that is most likely to cause a user to make a purchase may be placed in a prominent location on a web page in order to increase sales and revenue. Browsing behaviors may be positive or negatively associated, and metrics assigned to UGC may be based on visibility.

16 Claims, 10 Drawing Sheets

CLIENT PRODUCT PAGE

CLIENT PRODUCT DISPLAY PAGE 500 510 PRODUCT IMAGE 520 PRODUCT INFO

DETAILS REVIEWS SPECS 530

531 532 533 534 535 540

(56) References Cited

U.S. PATENT DOCUMENTS 6,757,682 B1 6/2004 Naimark et al.
6,785,671 B1 8/2004 Bailey et al.
6,999,962 B2 2/2006 Julliard et al.
7,085,820 B1 8/2006 Nickerson et al.
7,133,834 B1 11/2006 Abelow
7,222,078 B2 5/2007 Abelow
7,260,837 B2 8/2007 Abraham et al.
7,428,496 B1 * 9/2008 Keller et al. ................ 705/7.39
7,506,355 B2 3/2009 Ludvig et al.
7,620,565 B2 11/2009 Abelow
7,620,651 B2 11/2009 Chea et al.
7,809,740 B2 10/2010 Chung et al.
7,895,127 B2 * 2/2011 Weiser .......................... 705/306
7,908,173 B1 3/2011 Hill
7,908,176 B1 3/2011 Hill
7,930,363 B2 4/2011 Chea et al.
7,937,391 B2 5/2011 Chea et al.
8,311,792 B1 * 11/2012 Podgorny ............. G09B 19/00 707/734
8,321,300 B1 * 11/2012 Bockius et al. ............. 705/27.1
8,417,715 B1 4/2013 Bruckhaus et al.
8,554,601 B1 * 10/2013 Marsh et al. ................ 705/7.32
8,577,753 B1 * 11/2013 Vincent et al. .............. 705/26.7
8,635,169 B2 * 1/2014 Avedissian et al. .......... 705/347
8,650,492 B1 2/2014 Mui et al.
2002/0111865 A1 8/2002 Middleton et al.
2002/0112035 A1 8/2002 Carey et al.
2002/0165905 A1 11/2002 Wilson
2003/0101238 A1 5/2003 Davison
2003/0167195 A1 9/2003 Fernandes et al.
2005/0044197 A1 2/2005 Lai
2005/0216844 A1 * 9/2005 Error .................. G06F 17/3089 715/745
2006/0069564 A1 3/2006 Allison et al.
2006/0224445 A1 * 10/2006 Axe et al. ....................... 705/14
2007/0047691 A1 3/2007 Tseng et al.
2007/0050234 A1 3/2007 Corlett
2007/0059096 A1 3/2007 Boxall et al.
2007/0078833 A1 4/2007 Chea et al.
2007/0112760 A1 5/2007 Chea et al.
2007/0112916 A1 * 5/2007 Singh ........................... 709/206
2007/0157220 A1 * 7/2007 Cordray et al. .................. 725/9
2007/0169096 A1 7/2007 Chea et al.
2007/0198337 A1 * 8/2007 Coon .................... G06Q 30/02 705/14.71
2007/0244888 A1 10/2007 Chea et al.
2007/0250445 A1 10/2007 Ache
2008/0033781 A1 * 2/2008 Peretti .................... G06Q 30/02 705/14.72
2008/0091555 A1 4/2008 Heather et al.
2008/0109369 A1 5/2008 Su et al.
2008/0133488 A1 6/2008 Bandaru et al.
2008/0147991 A1 6/2008 Clark et al.
2008/0201348 A1 8/2008 Edmonds et al.
2008/0244431 A1 10/2008 Chea et al.
2008/0300909 A1 12/2008 Rikhtverchik et al.
2009/0007007 A1 1/2009 Voros et al.
2009/0037412 A1 2/2009 Bard et al.
2009/0089415 A1 4/2009 Lecomte et al.
2009/0119234 A1 5/2009 Pinckney et al.
2009/0119710 A1 5/2009 Lo et al.
2009/0158198 A1 6/2009 Hayter et al.
2009/0235236 A1 9/2009 Nickerson et al.
2009/0254422 A1 10/2009 Jenkins et al.
2009/0254529 A1 10/2009 Goldentouch
2009/0259526 A1 * 10/2009 Bechtel ............. G06Q 30/0203 705/7.32
2009/0271514 A1 10/2009 Thomas et al.
2009/0282052 A1 11/2009 Evans et al.
2009/0307159 A1 12/2009 Pinckney et al.
2010/0100536 A1 * 4/2010 Chamberlain et al. ....... 707/706
2010/0114883 A1 5/2010 Chea et al.
2010/0146110 A1 6/2010 Christensen et al.
2010/0161344 A1 6/2010 Dyson
2010/0174952 A1 7/2010 Anastas et al.
2010/0211457 A1 8/2010 Martin-Cocher et al.
2010/0306640 A1 12/2010 Gava et al.
2011/0145233 A1 6/2011 Aravamudan et al.
2011/0282758 A1 11/2011 Jacobi et al.
2012/0036259 A1 2/2012 Minnis et al.
2012/0042267 A1 * 2/2012 Cairns .................. G06F 3/0481 715/760
2012/0059722 A1 3/2012 Rao
2012/0226803 A1 9/2012 Bharadwaj
2012/0260209 A1 * 10/2012 Stibel et al. ................. 715/780
2012/0324359 A1 12/2012 Lee et al.

OTHER PUBLICATIONS

Claypool et sl. Implicit Interest Indicator, 2001, ACM, IUI'01 Proceedings of the 6th international conference on Intelligent user interfaces, pp. 33-40.*

Nichcy, How People Read on the Web, Aug. 2011 (links updated Aug. 2012), http://nichcy.org/dissemination/tools/webwriting/reading, 8 pages. [Retrieved Dec. 21, 2012].

Jakob Nielsen's Alertbox, F-Shaped Pattern for Reading Web Content, Apr. 17, 2006, http://www.useit.com/alertbox/reading_pattern.html, 3 pages. [Retrieved Dec. 21, 2012].

Sinan Aral and Dylan Walker, "Identifying Influential and Susceptible Individuals in Social Networks: Evidence from a Randomized Experiment," Workshop on Information Systems Economics (WISE) 2010, 8 pages. [http://misrc.umn.edu/wise/papers/1b-3.pdf].

Martin Klaus and Ralf Wagner, "Identifying Influential Communicator to gain "Consumer Insights" on Weblog Networks," ANZMAC 2009, 8 pages. [http://www.duplication.net.au/ANZMAC09/papers/ANZMAC2009-067.pdf].

Philip Sheldrake, The Social Web Analytics eBook 2008, http://www.influenceprofessional.com/wp-content/uploads/2011/04/The_Social_Web_Analytics_eBook_2008.pdf, Jul. 1, 2008 pp. 1-99. [Retrieved Dec. 21, 2012].

The Influence of Reviews in Consumer Purchase Decisions, Revinate, Inc., Nov. 3, 2010, bbg.revinate.com/2010/11/the-influence-of-reviews-in-consumer-purchases-decisions.html, 2 pages. [Retrieved Dec. 21, 2012].

Vasant Dhar and Elaine Chang, "Does Chatter Matter? The Impact of User-Generated Content on Music Sales," Leonard N. Stern School of Business, New York University, May 2007, http://archive.nyu.edu/bitstream/2451/23783/2/CEDER-07-06.pdf, 30 pages. [Retrieved Dec. 21, 2012].

Tracking Tourism: The Tourism Research Blog User generated content in travel: how do we measure it?, Highland Business Research 2004-2008, http://blog.highlandbusinessresearch.com/2008/08/27/user-generated-content-in-travel/, 11 pages. [Retrieved Dec. 21, 2012].

International Search Report and Written Opinion in Application No. PCT/US2013/021327 mailed Jun. 25, 2013, 10 pages.

Office Action in U.S. Appl. No. 12/888,559 issued Jul. 17, 2012, 17 pages.

Office Action in U.S. Appl. No. 12/888,559 issued Jan. 15, 2013, 14 pages.

Office Action in U.S. Appl. No. 12/888,559 mailed Jan. 5, 2015, 14 pages.

Office Action in U.S. Appl. No. 12/888,559 mailed Jul. 14, 2015, 15 pages.

Office Action in U.S. Appl. No. 12/888,559 mailed Jun. 13, 2014, 14 pages.

* cited by examiner

750

Display Window 760

IDENTIFYING AND ASSIGNING METRICS TO INFLUENTIAL USER GENERATED CONTENT

RELATED APPLICATIONS

This application claims the benefit of provisional application U.S. 61/585,430, titled "USER GENERATED CONTENT IMPRESSION AND CONSUMPTION TRACKING APPARATUS AND METHOD," filed Jan. 11, 2012, which is herein incorporated by reference in its entirety.

BACKGROUND

This disclosure relates to user generated content (UGC), and more particularly, to assigning one or more metrics to UGC that may be helpful in identifying influential or useful UGC.

When a good or service is reviewed by a large number of users, for example, there may be more UGC than a given web site visitor is comfortable reading. Some web site visitors may simply read the first one or two items of UGC that are presented, without reading any other UGC. Accordingly, when a large amount of UGC is available, identifying and determining what UGC should be presented to a user may be difficult. A user may thus end up reading UGC such as reviews, answers to questions, etc., that is not helpful to the user, or that influences the user not to purchase a particular product.

BRIEF DESCRIPTION OF THE DRAWINGS

FIGS. 7A and 7B are diagrams illustrating two embodiments of display windows.

DETAILED DESCRIPTION

Figure 1:
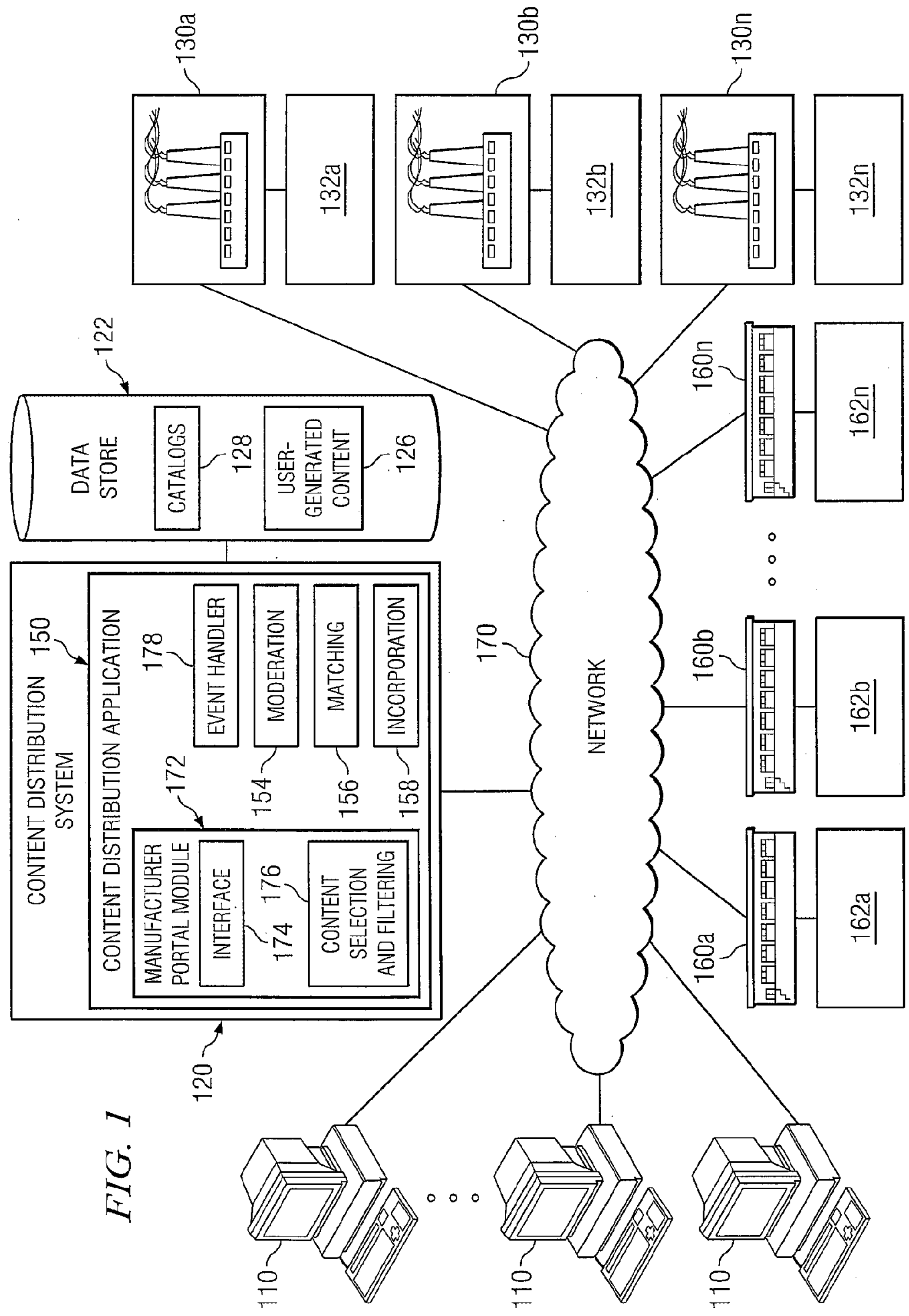
FIG. 1 is a diagram illustrating the topology of one embodiment of a content distribution system in which embodiments of the present systems and methods may be implemented.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The following paragraphs provide definitions and/or context for terms found in this disclosure (including the appended claims):

"Comprising." This term is open-ended. As used herein, this term does not foreclose additional structure or steps. Consider a claim that recites: "a system comprising a processor and a memory . . . ." Such a claim does not foreclose the system from including additional components such as interface circuitry, a graphics processing unit (GPU), etc.

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation(s), etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"First," "Second," etc. As used herein, these terms are used as labels for nouns that they precede unless otherwise noted, and do not imply any type of ordering (e.g., spatial, temporal, logical, etc.). For example, a "first" computing system and a "second" computing system can be used to refer to any two computing systems. In other words, "first" and "second" are descriptors.

"Based On" or "Based Upon." As used herein, these terms are used to describe one or more factors that affect a determination. These terms do not foreclose additional factors that may affect a determination. That is, a determination may be solely based on the factor(s) stated or may be based on one or more factors in addition to the factor(s) stated. Consider the phrase "determining A based on B." While B may be a factor that affects the determination of A, such a phrase does not foreclose the determination of A from also being based on C. In other instances, however, A may be determined based solely on B.

"Provider." As used herein, this term includes its ordinary meaning and may refer, in various embodiments, to a manufacturer, offeror of services, restaurant, reseller, retailer, wholesaler, and/or distributor.

"User generated content" (UGC). As used herein, this term refers to text, audio, video, or another information carrying medium that is generated by a user who may be a consumer of something (e.g., of goods, a product, a website, a service), a purchaser of that something, or may otherwise have an interest in that something. User generated content includes, in various embodiments, user reviews, user stories, ratings, comments, problems, issues, questions, answers, opinions, or other types of content.

Structures and techniques described herein allow UGC to be quantified using one or more assigned metrics. An assigned metric may be based on one or more browsing behaviors of a user that occur after the user is exposed to UGC.

For example, an assigned metric may indicate whether a user was more (or less) likely to make a purchase after being presented with particular UGC reviewing a product or service. The assigned metric may also indicate whether a user was more likely to take negative actions, such as closing a web browser, removing an item from a shopping cart, navigating to a competitor's website, etc.

Accordingly, by assigning metrics, UGC that is helpful, valuable, and/or useful may be identified. Such UGC may be presented to future users (e.g., web site visitors) in the hope that those future users make more purchases, have a greater number of questions answered, and have a higher level of satisfaction with a website, for example. Note that the teachings of this disclosure and the claims are expressly not limited by the features, embodiments, and/or benefits discussed above, however.

Turning now to FIG. 1, one embodiment illustrating the topology of a content distribution system in which embodiments of the present systems and methods may be implemented is shown. In some embodiments, manufacturers 130 may produce, wholesale, distribute or otherwise be affiliated with the manufacture, supply, and/or distribution of one or more products. Retailers 160 may be sales outlets or other providers for products made by one or more of manufacturers 130. These products may be provided for sale in conjunction with one or more websites (referred to as sites) 162 provided by each of retailers 160 such that users at computing devices 110 may access the retailer's site 162 over network 170 (for example, the Internet or another type of communications network) in order to purchase these products or perform other actions, in some embodiments.

In addition to offering the ability to purchase products, a retailer's site 162 may offer the ability for a user to access UGC associated with products, or categories of products, offered for sale. By accessing such UGC at the retailer's site 162 a user may be better able to make a purchasing decision with respect to the various products offered for sale on that retailer's site 162 or may be more inclined to buy a product, as the user may feel that the product has received positive treatment (reviews, ratings, questions/answers, etc.) from a critical mass of other users, in some embodiments. A user may thus purchase a manufacturer's product from a retailer 160 using retailer's site 162 in one embodiment.

Regardless of the manner in which a person obtains a product, that person may desire to provide some sort of feedback on the product. This may be true for a variety of reasons, such as a desire to assist other prospective purchasers in evaluating the product, expressing satisfaction or displeasure with the product, etc. In various embodiments, a person may thus express comments, problems, issues, question/answers, or almost any other type of content regarding a product or experience with the product, category, brand, manufacturer or retailer. The person's feedback may be provided through various means, including facilities provided on the retailer's site 162, the manufacturer's site 132, or other avenues in one or more embodiments.

Note: in various embodiments, provider system 620, as discussed below, may correspond to any or all of the features, characteristics, and/or functionality of retailer's site 162 and/or manufacturer's site 132 and vice versa, as is consistent with this disclosure. Likewise, content system 630, as discussed below, may correspond to any or all of the features, characteristics, and/or functionality of content distribution system 120 and vice versa, as is consistent with this disclosure.

In one embodiment, retailer site 162 may offer the ability for a user to generate content with respect to products offered for sale by retailer 160 or categories of products offered for sale. In other words, in various embodiments, a user may utilize the retailer's site 162 to generate user reviews, ratings, comments, problems, issues, question/answers, or almost any other type of content, regarding a product or experience with the product, category, brand, manufacturer or retailer, where this user generated content may be displayed to users accessing retailer's site 162.

In one embodiment, manufacturers 130 may provide manufacturer's sites 132 where these sites, or other means of collecting information from the user, can provide the ability for a user to generate content with respect to the manufacturer's products. In other words, in various embodiments, a user may use the manufacturer's site 132 or these other means, to generate user reviews, ratings, comments, problems, issues, question/answers, or almost any other type of content regarding a product, category, brand, manufacturer, etc. usually regardless of where the user purchased the manufacturer's product.

In one embodiment, the user generated content which may be generated at a retailer's site 162 or manufacturer's site 132 may include reviews, stories, ask/answer content or any other type of content in any format which the user wishes to add regarding a product, brand or service (collectively referred to as a product herein), or category of products. Reviews may correspond to a user evaluation of a product and include ratings of product (for example, a number of stars or numerical rating), pros and cons of the product, a descriptive title and a description of a user's experience with a product (referred to as the body of the review), attributes of the user generating the review (for example, demographic information), other product(s) which compliment or may be used with the product being reviewed, pros and cons of the product or any other type of evaluation of a product or aspects of a user's experience with the product, in various embodiments. Ask/Answer content may comprise questions or answers submitted by a user, retailer or manufacturer concerning a potential purchase decision, for example regarding the capabilities or use of a product or category of products, demographic information on a user generating a question or answer, in some embodiments. In one embodiment, stories may be user generated content which may pertain to open ended experiences with one or more products or categories of products which may be more tangentially related to the product than, for example, reviews.

In one embodiment, content distribution system 120 may be coupled to network 170 and serve to distribute content generated at both retailer's site 132, manufacturer's site 162, or another location, to retailers' sites 162 which offers these products or categories of products for sale such that the content generated by a user with respect to that product or category at the retailer's site 162 and the manufacturer's site 132 is incorporated into that retailer's sites 162 where the product, or category of product, is offered. Thus, in one embodiment, content distribution system 120 allows content generated at a particular retailer's site 162 to be combined with content generated at the manufacturer's site 132 and incorporated into that retailer's site 162 in conjunction with that product, category, brand, etc.

Additionally, in some embodiments, as manufacturers 130 may desire to obtain information on their products that are being sold and the content generated by users about these products, content distribution system 120 may analyze the received user generated content or associated data to determine statistical information related to the user generated content or the manufacturer's products. This statistical data, in some embodiments, may include an importance metric for one or more of the manufacturer's products where the importance metric is a measure of the relative importance of the manufacturer's products. This statistical data, in some embodiments, may be filtered by, for example, categories of products for sale, brands, types of user generated content (for example, accepted or rejected for publishing), content codes, date ranges, retailer site, keyword, rating level, or other criteria such that the statistical data presented is calculated based on user generated content associated with that filter. In one embodiment, a manufacturer may thus be presented with statistical data related to user generated content associated with that manufacturer or manufacturer's products which was generated at any of retailer's sites 162 or manufacturer's sites 132 and which may be associated with particular criteria as specified by the manufacturer.

Content distribution system 120 will now be discussed in more detail. In various embodiments, content distribution system 120 may include one or more computers communicatively coupled to a network 170 and a data store 122. In some embodiments, data store 122 may comprise user generated content 126 and catalogs 128. In some embodiments, user generated content 126 may be associated with one or more products or categories, where this user generated content may have been generated at manufacturer's site 132, retailer's site 162 or at another location altogether. In some embodiments, catalogs 128 may comprise a set of catalogs, each catalog corresponding to a retailer 160 or manufacturer 130. In one embodiment, a catalog may comprise a set of category identifiers utilized by the retailer or manufacturer, where each category identifier may be associated with one or more product identifiers and each product identifier may be, in turn, associated with a brand name, a product name, or any number of other desired attributes. In one embodiment, a catalog may, for example, comprise one or more files of eXtensible Markup Language (XML). These catalogs 128, in some embodiments, may be received from retailer 160 or manufacturer 130, for example over network 170, at a regular or semi-regular basis. For example, in one embodiment catalogs may be received nightly from retailer 160 or manufacturer 130. It will be apparent that each retailer or manufacturer may provide their catalogs at different times, according to different time periods or schedules, irregularly, etc., in various embodiments.

In some embodiments, catalogs 128 may also comprise one or more catalogs generated from catalogs received from retailers 160 or manufacturers 130. For example, in one embodiment a global catalog associated with each manufacturer may be created by consolidating portions associated with that manufacturer of each catalog received from retailers 160 with any catalogs received from the manufacturer 130. A global catalog may, for example, in one embodiment, comprise a set of global categories and associated global products identifiers where product identifiers and category identifiers used by the retailers for corresponding categories and products may be associated with these global identifiers.

In one embodiment, a global identifier may be associated with item information from each of a set of matched items consolidated from each of the retailer or manufacturer catalogs. As an item is added to the global catalog or an item's information is updated, in one embodiment, the name of the category from each retailer may be added as a 'tag' associated with the global identifier for the item. An item can have multiple category tags in some embodiments. An interface may be is provided for administrators to add, combine and rename category tags in some embodiments. For example, in one embodiment, a product could be in the "LCD Monitors" category in one retailer and "19 inch Monitors" for another retailer. This item might get added under both categories in the global catalog in this embodiment. A user, could, if desired choose to consolidate these two categories into, for example, a "Monitors" category, in some embodiments.

In one embodiment, content distribution system 120 may also include a content distribution application 150 which comprises a statistical information processing module 172, a moderation module 154, a matching module 156 an event handler module 178 and an incorporation module 158. In one embodiment, moderation module 154 may moderate (for example, filter or otherwise select), or allow to be moderated, content which is, or is not to be, excluded or included, while matching module 156 may serve to match received user generated content with a particular product or category. In one embodiment, this matching process may be accomplished using catalogs 128.

In some embodiments, incorporation module 158 may be configured to incorporate user generated content into a retailer's site 162, or other site, for display to a user. In one embodiment, the user generated content associated with a product or category may be received by content distribution system 120 and stored in association with a product or category. In one embodiment, the received content may be moderated by moderation module 154, to determine if such content should be utilized for display on a site, or may be edited for suitability. In one embodiment, this moderation process may comprise different levels of moderation, including auto processing of the user generated content to identify blacklisted users or trusted users; human moderation which may include manually classifying content or content recategorization; proofreading; or almost any other type of moderation desired. Note, however, that such moderation may or may not be employed in certain embodiments. For example, content from certain manufacturers may not undergo such a moderation process, or may undergo moderation at a different point, in various embodiments.

In one embodiment, this moderation process may also comprise associating tags with the received user generated content. These tags may comprise content codes which pertain to the received user generated content in various embodiments. The user generated content may also be associated with a manufacturer, products or categories of products offered for sale by retailer 160 or the manufacturer 130, a user attributes of the user who generated the content, product attributes, etc., by, in one embodiment, associating the user generated content with a product identifier for a product, or a category identifier for a category, and storing the content and the determined associations in data store 122.

Some of these associations may be determined in some embodiments using matching module 156 which may compare data received in conjunction with the user generated content (for example, product data, category data, user data, etc.) with data in a catalog 128. Once it is decided that the user generated content is to be stored in data store 122 and allowed to be disseminated (for example, has been moderated), in one embodiment, event handler 178 may take certain actions based on the user generated content or its associated data. These events may be tailored to the type of content generated or other attributes of the content.

In one embodiment, content from content distribution system 120 may be incorporated into a portion of a web page of retailer's site 162. In one embodiment, the web page may include a software module (e.g., a java script) that is executed when the web page is loaded on a user's computing device 110. In one embodiment, this program may send data such as the product data, user data, display codes, etc. to incorporation module 158. Incorporation module 158 may utilize this data in one embodiment to determine which user generated content 126 will be returned to be displayed with the page, as well as the format in which the data will be displayed.

Incorporation module 158 may also return an additional software module with the user generated content to track user interaction with the user generated content. When the web page is loaded, the tracking module is executed. The tracking module is designed to determine the amount of time spent by a user reading each of the individual pieces of user generated content on the web page. This is accomplished by determining the visibility of individual pieces of user generated content on the web page and the amount of time each piece of content is visible. Because the time spent reading a piece of user generated content is determined by measuring the amount of time the content is visible, it is not necessary for the user to take any action to indicate that the content has been read. The user can instead passively interact with the user generated content by simply scrolling to view the desired piece(s) of user generated content and reading the content. "Passive" is used herein to refer to user interactions with the content elements on the web page in which the user does not click on or otherwise explicitly select these elements, but instead simply scrolls the web page to move a viewing pane, thereby making the content elements viewable and allowing them to be read.

Figure 5A:
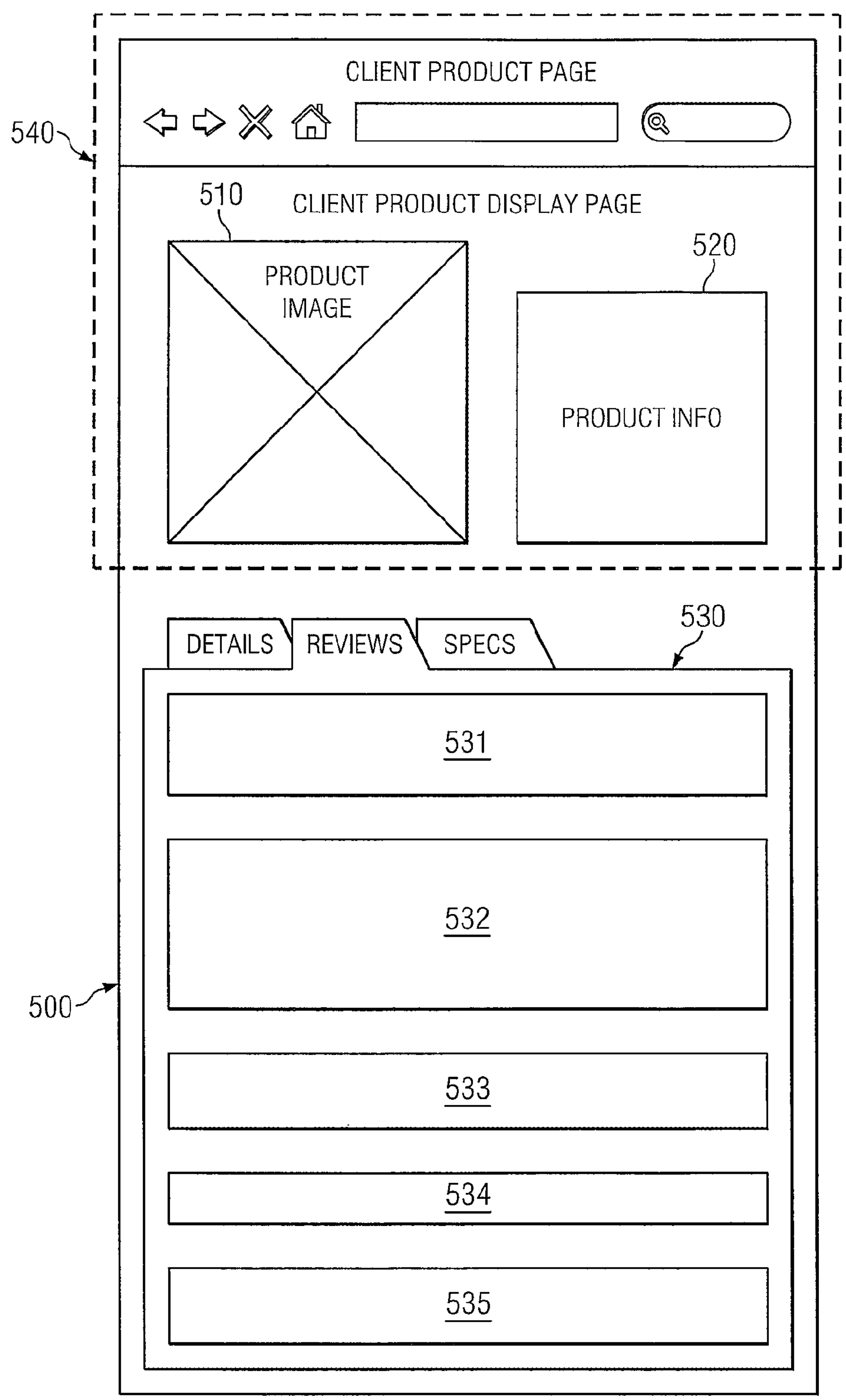
FIGS. 5A and 5B are diagrams illustrating one or more embodiments of the relationship of a viewing pane of a user device to a web page that is loaded on the user device.
Figure 5B:
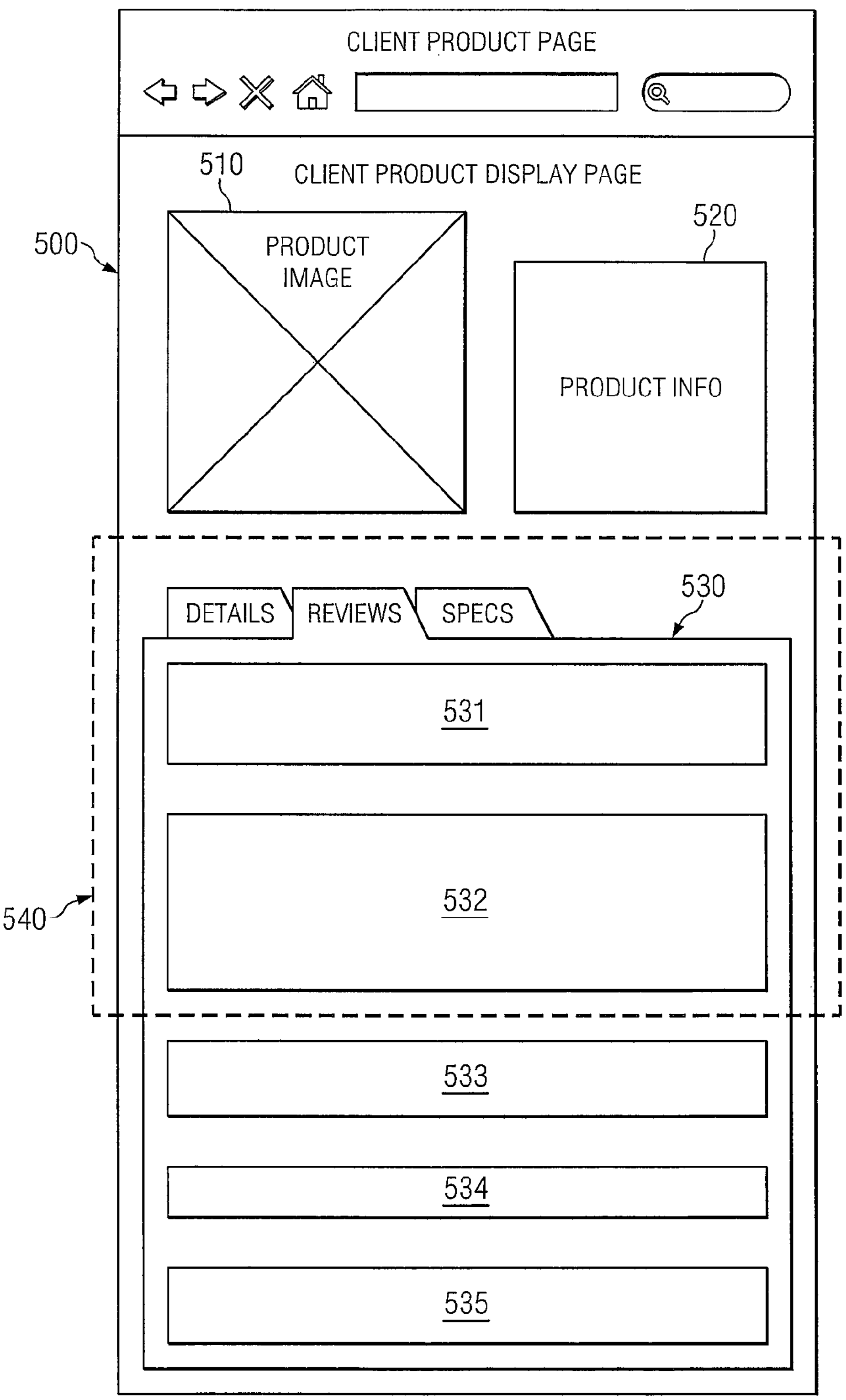

Referring to FIGS. 5A and 5B, the relationship of a viewing pane to a web page is illustrated. In these figures, a web page 500 contains multiple content elements, such as a product photo 510, a textual description 520 of the product, and several tabbed frames (e.g., 530) which contain additional content. In these figures, frame 530 contains a series of user generated reviews (531-535) of the product depicted and described on the page. The whole web page is, in this case, too large to be legibly displayed in its entirety on the user device. The user device can only display a portion of the web page at a single time. The displayed portion is referred to as the viewing pane 540. The viewing pane moves across the web page as the user scrolls through the page. FIG. 5A depicts the user pane in an initial position at the top of the web page, where only product photo 510 and textual description 520 can be viewed. FIG. 5B depicts the user pane at a lower position where reviews 531 and 532 are visible to the user. As the user scrolls from the position of FIG. 5A to the position of FIG. 5B, reviews 531 and 532 become visible, and the tracking code begins timing the implied reading of these reviews.

Although the visibility of the individual pieces of user generated content in the viewing pane of a user device may not provide an exact measure of the time spent reading each piece of user generated content, an exact measurement would require means to track the user's eye movements, which is impractical. Since the scrolling of the web page indicates that the user is viewing the web page (and reading viewable text content elements), tracking the time a piece of content is viewable in the viewing pane provides a practical method for determining the amount of time the user spends reading the viewable content.

In one embodiment, the product web pages that are provided by a retailer or manufacturer include a software module (such as JavaScript or other set of computer readable instructions) that enables content distribution system 120 to provide user generated content that is injected into the web page when it is loaded onto a user device and displayed. This module is embedded at the top level of the web page so that this code, as well as tracking code that is later injected into the page with retrieved user generated content, is aware of all of the elements on the page. If the tracking code were only able to access elements within a particular frame (e.g., a frame in which reviews or other user generated content might be contained), it would be difficult to ascertain the locations of the web page's elements within a viewing pane of a user device, thereby making it difficult to reliably attribute an amount of reading time to a particular piece of user generated content.

Figure 2:
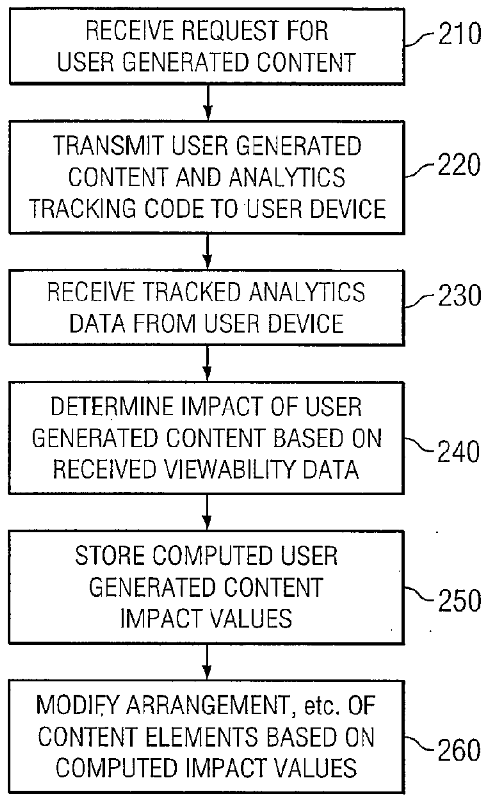
FIG. 2 is a flow diagram illustrating one embodiment of a method related to receiving a request for UGC.

The tracking of passive user interaction with user generated content and the determination of the impact of the user generated content will now be discussed in more detail. Referring to FIG. 2, a flow diagram of an exemplary method is illustrated. This method would be performed by a server computer such as might be employed by content distribution system 120 to provide user generated content. At step 210, the content distribution system receives a request for user generated content. This request is generated by the software module which is embedded in a product web page provided by a retailer web site and it loaded onto a user device. When the web page is loaded, the software module executes, generating the request for user generated content (e.g., reviews) to be displayed on the product web page.

In response to the received request for user generated content, the content distribution system retrieves suitable content from a storage device. This content may, for example, consist of reviews for a particular product with which the web page is associated. In addition to the content, the content distribution system retrieves tracking code (e.g., javascript) which is also stored on the storage device coupled to the content distribution system. Both the user generated content items and the tracking code are transmitted to the user device as shown in step 220. This user generated content and tracking code are loaded on the user device with the product webpage.

The tracking code is executed when it is loaded by the user device. The tracking code monitors the positions and the visibilities of the various pieces of user generated content that were provided by the content distribution system and loaded onto the user device. The tracking code determines whether each user generated content item has been read, as well as the amount of time spent by the user reading the item (as implied by the length of time the item is visible in the viewing pane of the user device). The tracking code may also monitor information such as the order in which user generated content items are viewed, the total time spent viewing all user generated content, the total time spent on the web page, the product associated with the web page, whether a purchase transaction has been initiated with respect to the product, a user identifier, and various other information. The tracking code then transmits the tracked information from the user device to the content distribution system. The information may be transmitted, for example, as it is acquired, when the user closes the web page or when the user requests a different web page.

At step 230, the information generated by the tracking code is received by the content distribution system. The content distribution system uses this information to compute an impact metric for each of the individual pieces of user generated content (see step 240). In this embodiment, the data corresponding to each user generated content item is aggregated with other data that had previously been obtained for the item. For example, one of the user generated content items may have been previously injected into a web page for an associated product on 100 previous occasions. Of these 100 occasions, the item may have been read 50 times. For each of the 50 instances in which the item was read, the content distribution system may have stored corresponding data identifying the amount of time the item was read, and whether or not an associated purchase transaction occurred. The newly received data and the previously stored data are used by the content distribution system to compute an impact metric. In one embodiment, this metric is computed by taking a number of the instances that are associated with purchase transactions, and dividing this number by the total number of instances. For example, if ten of the instances resulted in purchase transactions, the impact metric would be 10/51, or 0.196. This impact metric may be computed each time new data associated with the particular user generated content item is received, or it may be computed periodically for one or all of the user generated content items.

Determine visibility of user generated content in viewing: At step 250, the computed impact metric is stored. The stored information regarding the impact of the user generated content items may be used in various ways. For instance, if particular ones of the content items have a high impact metric indicating a high likelihood that users who read these content items will purchase the associated products or services, it will be desirable to ensure that these items are presented to users who are considering purchasing the associated products. In particular, since it has been found that users are most likely to read only the first few reviews that are presented in association with a product, retailers and manufacturers will likely desire that the user generated content items be positioned on a web page (see step 260) such that they are presented in order of the greatest impact metric values (i.e., the item with the highest impact metric will be presented first, then the item with next-highest impact metric, and so on). This arrangement would be expected to be the most likely to influence a user who reads these user generated content items to purchase the corresponding product or service.

Figure 3:
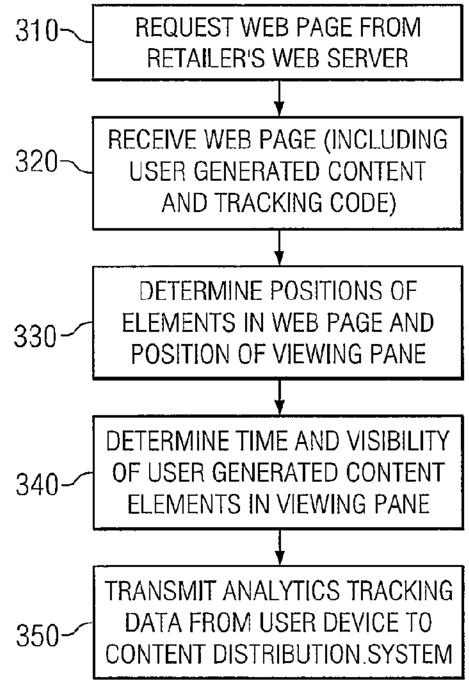
FIG. 3 is a flow diagram illustrating one embodiment of a method related to receiving a web page that includes UGC.

Referring to FIG. 3, a flow diagram of another exemplary method is illustrated. In this case, the method would be performed by a user device such as might be employed by a user to view product pages requested from a retailer's web site. At step 310, a user device requests a product web page from a retailer's web site. At step 320, the user device receives a web page responsive to the request. The web page provided by the retailer's web site includes various content elements (e.g., product description, photos, specifications, etc.) as well as a software module that enables a third party content distribution system to provide user generated content such as reviews, questions-and-answers, etc. As the web page loads on the user device, the software code requests user generated content from the third party server and receives the requested content, as well as tracking code, which are loaded onto the user device.

At step 330, the tracking code provided by the third party service is executed on the user device. This code is able to determine the positions of all the elements on the web page since it was called by the software module embedded at the top level of the retailer's web page. The tracking code determines the positions of the elements in the web page and determines which of the elements are visible in a viewing pane of the user device. When the user scrolls through the web page, the tracking code determines the length of time each of the supplied pieces of user generated content is visible to the user (step 340). The tracking code may also determine the particular portions of the viewing pane in which the user generated content appear, the order in which the user generated content items are viewed, whether the items were previously visible in the viewing pane, the product or services with which the web page is associated, whether a purchase transaction has been initiated with respect to the product or services, etc.

In one embodiment, the analytics tracking is triggered by dynamically polling client-side scrolling activity for changes. As the user scrolls down the page, consuming product information, client-side tracking code monitors changes in the scroll position. Once the injected user generated content becomes visible in the viewing pane, the client-side tracking code begins storing viewing data on each piece of visible content visible. At specific, client-configurable time intervals (i.e. −10 seconds, 20 seconds, etc.) this meta-data is packaged up and sent to the content distribution system by way of an event call. Each event may be transmitted back to the content distribution system (or another server configured to receive this data), where it can be collected and analyzed. In one embodiment, event data that is transmitted back to the content distribution system provides a virtual snapshot of the visible content including content identifiers of each piece of user generated content and the visible area of the content. The events may also include relevant contextual meta-data regarding browsing behavior, such as an event type ("wait", "scroll", "focus"), elapsed time since the page load, display codes, price, average rating, the total number of user generated content items, the page number of the user generated content, the IP address, and the default sort order for the current content.

It should be noted that specific manner in which analytics are tracked and communicated to the content distribution system may vary from one embodiment to another. In one alternative embodiment, rather than buffering data at the user device and periodically transmitting the buffered data to the content distribution system, individual events are communicated as they occur. For instance, once a user scrolls, scrolling events are fired with each movement. After the user stops scrolling, the system begins firing "wait" events which delineate between a user "scanning" a page's content and beginning to engage deeper (i.e. reading the content). Whether data is communicated with each event, or buffered for periodic communication, the same type of data is communicated. The communication of data with each event, however, may be less efficient than periodic transmissions of buffered data because of the overhead associated with each individual transmission of data.

At step 350, the information determined by the tracking code is transmitted to the third party content distribution system. It should be noted that the information may be transmitted as it is acquired, or all at once. The transmitted information may include, for each item of user generated content, the amount of time the item was viewed, the order in which the item was viewed, the time spent viewing the page, an identifier of the product or service on the page, and an indication of whether the user initiated a purchase transaction for the product or service.

Figure 4:
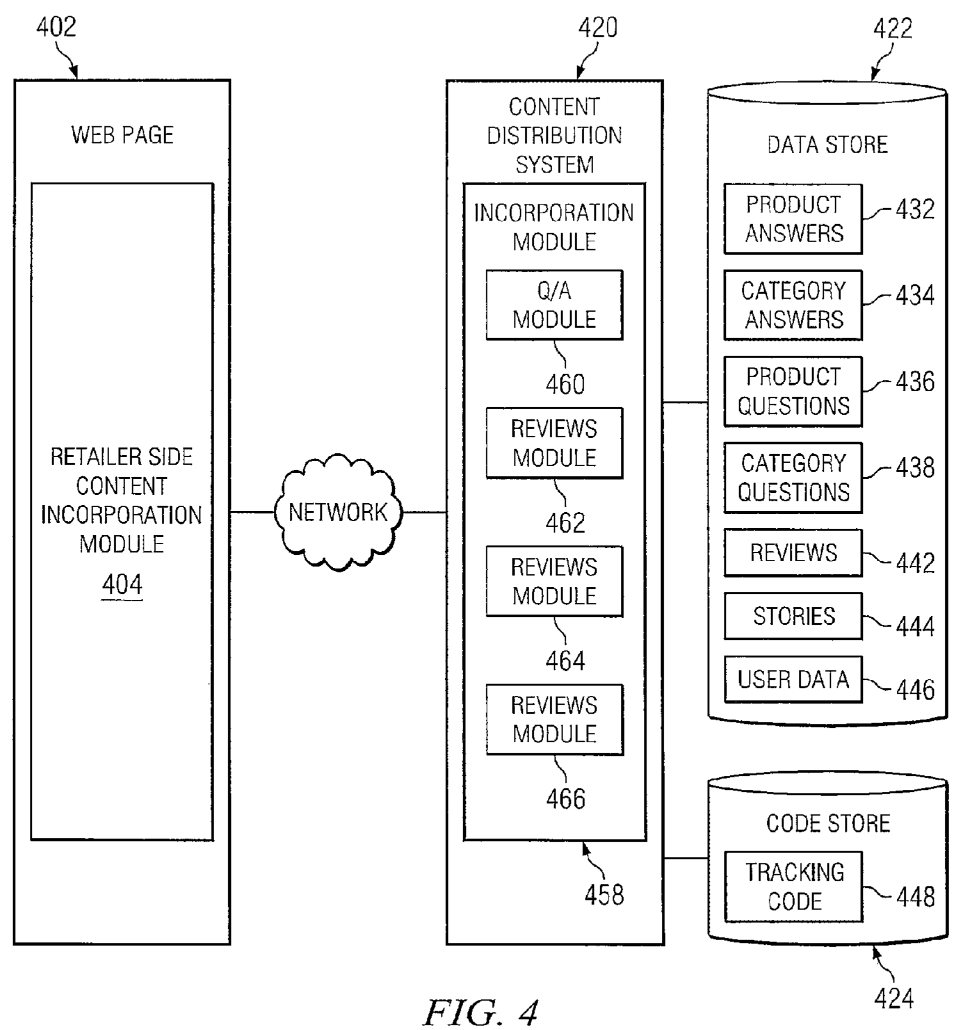
FIG. 4 is a diagram illustrating one embodiment of an architecture in which UGC may be incorporated into a web page of a retailer.

Referring to FIG. 4, a diagram illustrating an embodiment of an architecture which may be utilized for the incorporation of user generated content and tracking code into a web page of the retailer is depicted. Incorporation module 458 at content distribution system 420 may have one or more content delivery modules configured to generate specific types of content for incorporation in a retailer's web site including, a question/answer module 460, a reviews module 462, a stories module 464, a tracking code module 466 or any other modules which are desired. Each of modules 460, 462, 464 may utilize associated data stored in data store 422 to determine which content to provide in response to a request such that appropriate content may be generated in response to a request. Incorporation module 458 also includes a tracking code module 466. Tracking code module 466 selects code elements that are stored in code store 424 and provides the selected code elements to a user device along with the appropriate user generated content from data store 422 in response to the request from that device.

Data store 422 may comprise user generated data that includes: product answers 432, including a set of answers, each of which is associated with the user who generated the answer (for example a manufacturer or user associated with a manufacturer as described above), the associated question, a site on which the answer was generated and a product associated with the question; category answers 434, including a set of answers, each of which is associated with the user who generated the answer (for example a manufacturer or user associated with a manufacturer as described above), the associated question, a site on which the answer was generated and a product or category associated with the question; product questions 436, including a set of open questions, each of which is associated with a user who generated the question, a site on which the answer was generated and a product to which the question pertains; category questions 438, including a set of open questions, each of which is associated with a user who generated the question, a site on which the answer was generated and a product or category to which the question pertains; reviews 442, which may be reviews of associated products generated by associated users at associated sites; stories 444, including stories about one or more associated products or categories generated by associated users on associated sites; and user data 446, which may comprise information on users who have generated content with respect to a retailer. It will be noted that these types of data, content, groupings, associations, etc. are provided by way of example only, and that other types of data, content, groupings of content, associations, etc. may be utilized in conjunction with other embodiments.

As discussed above, a web page 402 at a retailer's site associated with a product or category may include a retailer side content incorporation module 404. This retailer side content incorporation module 404 may be a program which when executed in conjunction with the loading of the web page 402, obtains content from one or more of the content delivery modules 460, 462, 464, 466 and incorporates the content into a corresponding portion on the web page 402 configured to display the content. In particular, retailer side content incorporation module 404 may, when the web page 402 is loaded by a user, issue one more calls to a content delivery module 460, 462, 464 of incorporation module 458 at a content distribution system 420. A call to a content delivery module 460, 462, 464 may include a reference to a product or category associated with the web page 402 such as a product or category identifier. In response to a call from the content incorporation module 404, the called content delivery module 460, 462, 464 may generate content of the desired type (including the ability to generate additional content) corresponding to the product or category identified in the call and return this content to the content incorporation module 404 which issued the call.

For example, suppose a user views a web page 402 associated with a particular product. Retailer side content incorporation module 404 may, when the web page 402 is loaded by a user's browser, issue a call to question/answer module 460 referencing the particular product. In response, question/answer module 460 may utilize the identified product, product answers 432, category answers 434, product questions 436, category questions 438, user data 446, etc. to generate question/answer content and return this content to the retailer side content incorporation module 404 along with the ability to generate additional question/answer content, which may include, for example, the ability to ask new questions about the product or category or answer open questions about the product or category. The retailer side content incorporation module 404 may then incorporate the received question/answer content into a portion of the web page 402 configured to display such question/answer content. Since, as discussed above, the product answers 432 or category answers 434 may include answers generated by a user associated with a manufacturer, this manufacturer generated content may be incorporated in the question/answer content generated and returned to the retailer side content incorporation module 404. In particular, in one embodiment the manufacturer generated content may be incorporated in such a way that it is displayed by the retailer side content incorporation module 404 in conjunction with the question to which the manufacturer generated content is responsive.

As it may be desired to incorporate different types of content into various different types of web pages, it should be noted here that various embodiments of a retailer side content incorporation module may call different content delivery modules based on what type of web page incorporates the retailer side content distribution module and that additionally, the data included in the call (for example, a product identifier, category identifier, user identifier, etc.) may likewise differ based on the type of web page, the content delivery module called, or a number of other criteria.

Figure 6:
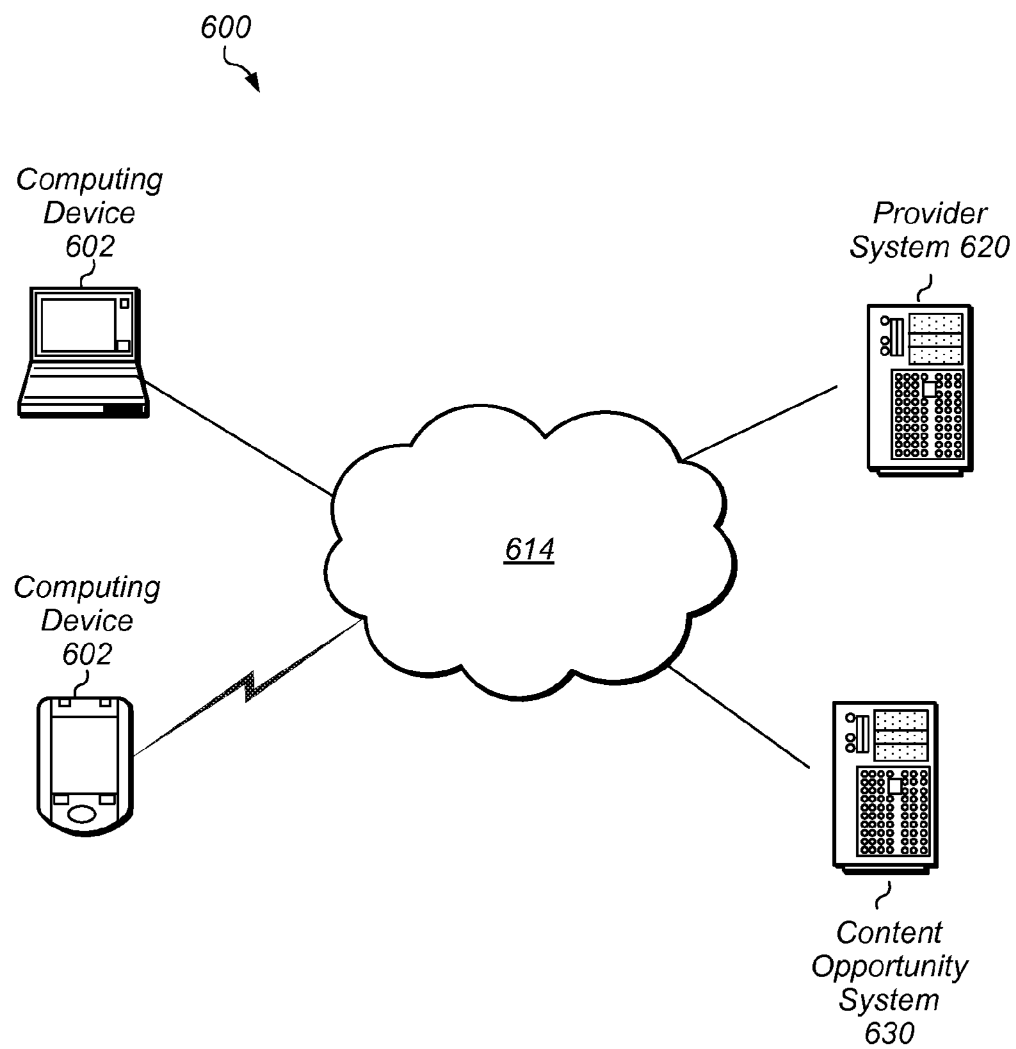
FIG. 6 is a diagram illustrating one embodiment of a system overview.

Turning now to FIG. 6, a diagram 600 depicting one embodiment of a system overview is shown. In this figure, one or more user computing devices 602 may be in communication with one or more of systems 620 and 630 via a network 614. Network 614 may be the Internet in some embodiments, and may include one or more other networks (not depicted), wired or wireless communication links, etc.

User computing device 602 may be a mobile device, laptop, desktop, or other type of computing system. In various embodiments, user computing device 602 may correspond to one or more aspects of computer system 1000 (described below relative to FIG. 10). Likewise, each of systems 620 and 630 may by any type of computing system, and in various embodiments may correspond to one or more aspects of computer system 1000. In some embodiments, a user computing device 602 is associated with a first user who may provide, view, or otherwise interact with UGC that is presented to the first user (e.g. via a web page).

In one embodiment, user computing device 602 is configured to cause data that is indicative of one or more browsing behaviors of a user of device 602 to be transmitted to another system (e.g., content system 630). For example, in one embodiment, JavaScript, PHP, or other executable code may be employed on user computing device 602 to gather data relating to a user's web browsing experience, such as what websites and/or web pages a user visits, whether a user purchases a good or service, and whether (and for how long) one or more particular portions of a web page are displayed on screen. In some embodiments, user computing device 602 is therefore configured to make determinations as whether particular UGC has been (or is being) displayed. User computing device 602 is not thus limited, however, and may gather data related to any number of browsing-related behaviors, such as mouse-over events, in-page navigation (e.g., scrolling up and/or down), highlighting, selecting, copying and/or pasting text, etc.

Provider system 620 may be any computer system associated with a provider of goods and/or services in various embodiments. Thus, provider system 620 is owned or operated by a provider in some embodiments, while in other embodiments, may be owned or operated by another party (e.g., a third party having a relationship with the provider).

Provider system 620 may include a server configured, in various embodiments, to facilitate purchases of goods or services, to provide information about one or more goods or services (which may include UGC), and/or to solicit UGC relating to personal experiences with one or more goods or services. In some embodiments, provider system 620 is configured to other functions as well (e.g. interfacing with delivery systems, payment systems, etc.). In some embodiments, provider system 620 may also gather data related to browsing-related behaviors and UGC in similar ways to those discussed above (relative to user computing device 602).

Content system 630 may, in various embodiments, be configured to receive UGC, store UGC, collect data indicative of one or more browsing behaviors of one or more users, assign metrics to UGC, and/or perform other actions. In some embodiments, content system 630 is configured to receive UGC and/or other information (e.g., browsing behavior, transaction details, etc.) from provider system 620, and may be controlled by (or associated with) an entity other than an entity that owns or operates provider system 620. Content system 630 may receive UGC and/or other data from other systems not depicted (e.g., a system corresponding to an external site such as YELP.COM, GOOGLE.COM, etc.) in some embodiments.

Figure 7A:
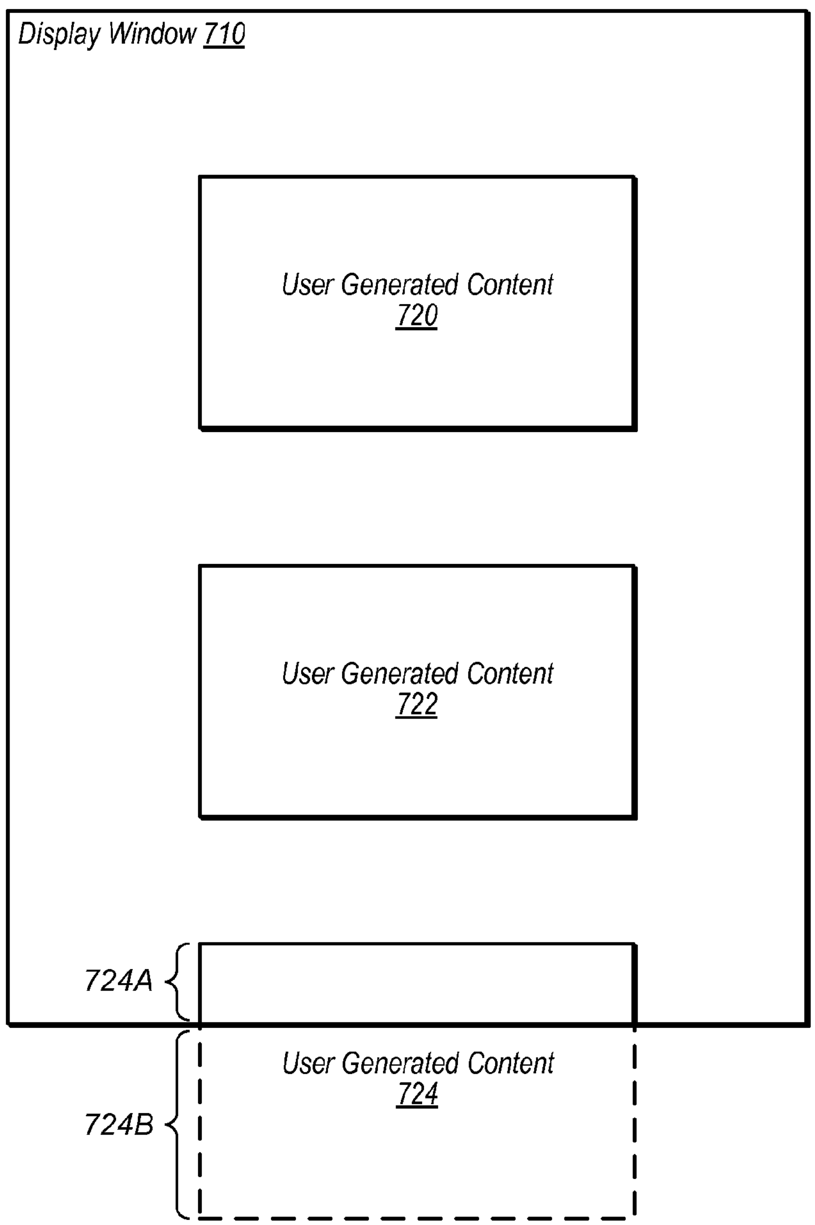

Turning now to FIG. 7A, a block diagram 700 depicting one embodiment of a display window 710 is shown. Display window 710 may be presented on a display of user computing device 602 in some embodiments. In one embodiment, display window 710 corresponds to a window (or display portion) corresponding a web browser. Display window 710, in some embodiments, may have any or all of the characteristics, features, and/or functionality that is described in relation to FIGS. 5A-5B, as is consistent with this disclosure.

Display window 710 includes a portion of a website or web page that relates to a particular good or service in one embodiment (such a web page on which a product is offered for sale). As shown in the embodiment of FIG. 7A, display window 710 includes UGC 720 and 722. As just one example, UGC 720 may include a first user's review of a particular product, while UGC 722 may include another user's answer to a question.

As shown, display window 710 also includes a portion 724A of UGC 724. However, in the embodiment of FIG. 7A, portion 724B is not included in display window 710. A user of a computing device 602 may thus be unable to view portion 724B without taking an action such as scrolling down (or otherwise repositioning the contents of display window 710). A user that cannot view all (or at least a substantive portion) of UGC 724 may, in some embodiments, not consider the content of UGC 724 when engaging in a browsing behavior (e.g., a consumer contemplating making a purchase may not have considered reviews that are only partly visible within display window 710 because there was no opportunity to read a substantive portion of the partly-visible reviews, etc.). Whether at least a threshold portion of UGC is visible to a user may therefore, in at least one embodiment, be relevant to assigning a metric or performing other actions, as discussed below.

Figure 7B:
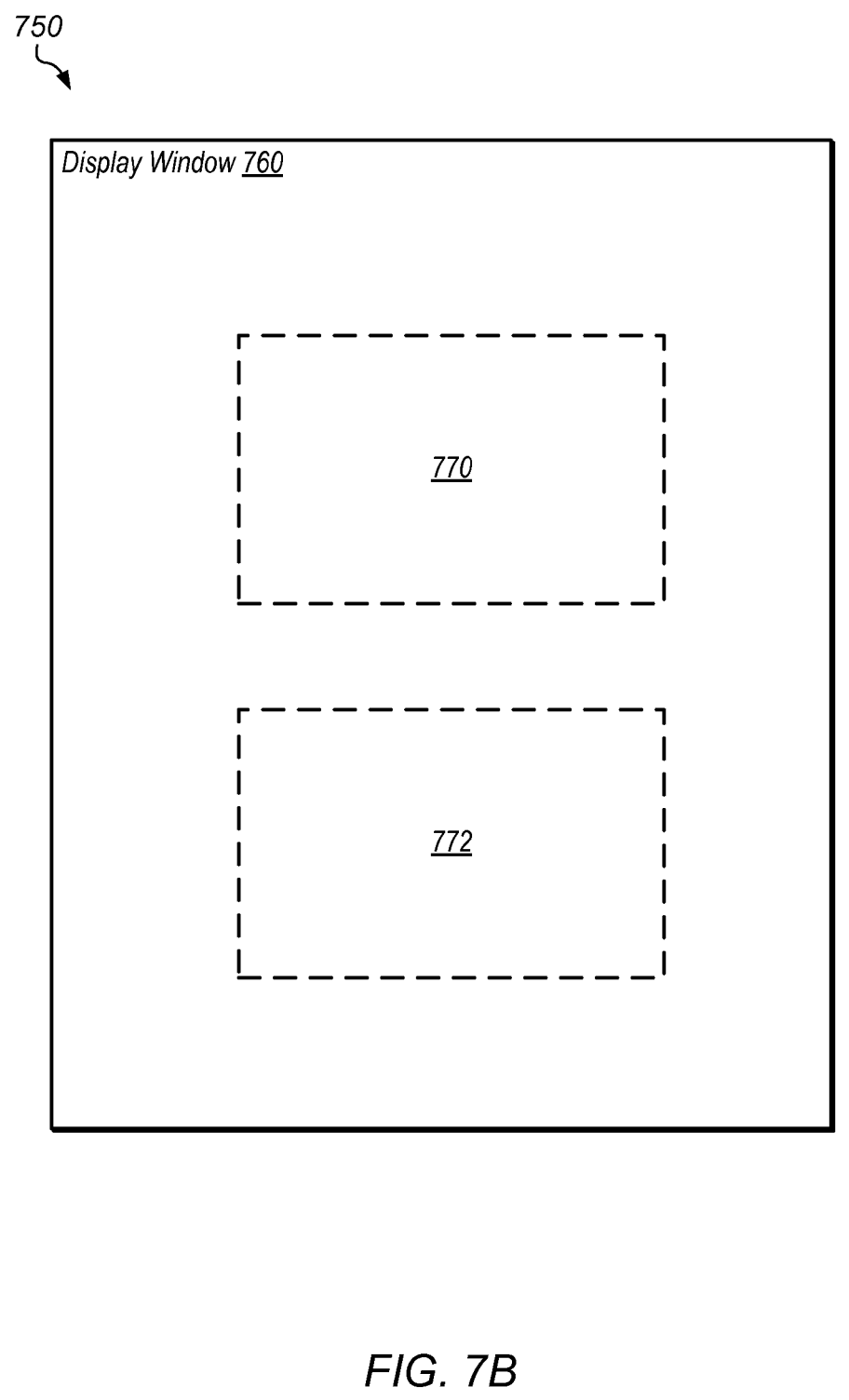

Turning now to FIG. 7B, a block diagram 700 depicting one embodiment of a display window 760 is shown. The contents of all or a portion of display window 760 (which may be a display of web page) may be dynamically determined, in some embodiments, by provider system 620, content system 630, and/or another system or device (for example, in response to a user request). Thus, a determination may be made as to whether to place particular UGC in location 770, location 772, or another less prominent location (not depicted).

For example, a dynamically created web page may display particular UGC that is believed to be most helpful, most likely to lead to a purchase, etc., in a more prominent location (e.g., as the first of a series of reviews). Thus, in one embodiment, a first computer system (e.g., content system 630) may transmit UGC to a second computer system (e.g., provider system 620) that is configured to cause the UGC to appear in one or more particular locations of a web page.

Figure 8:
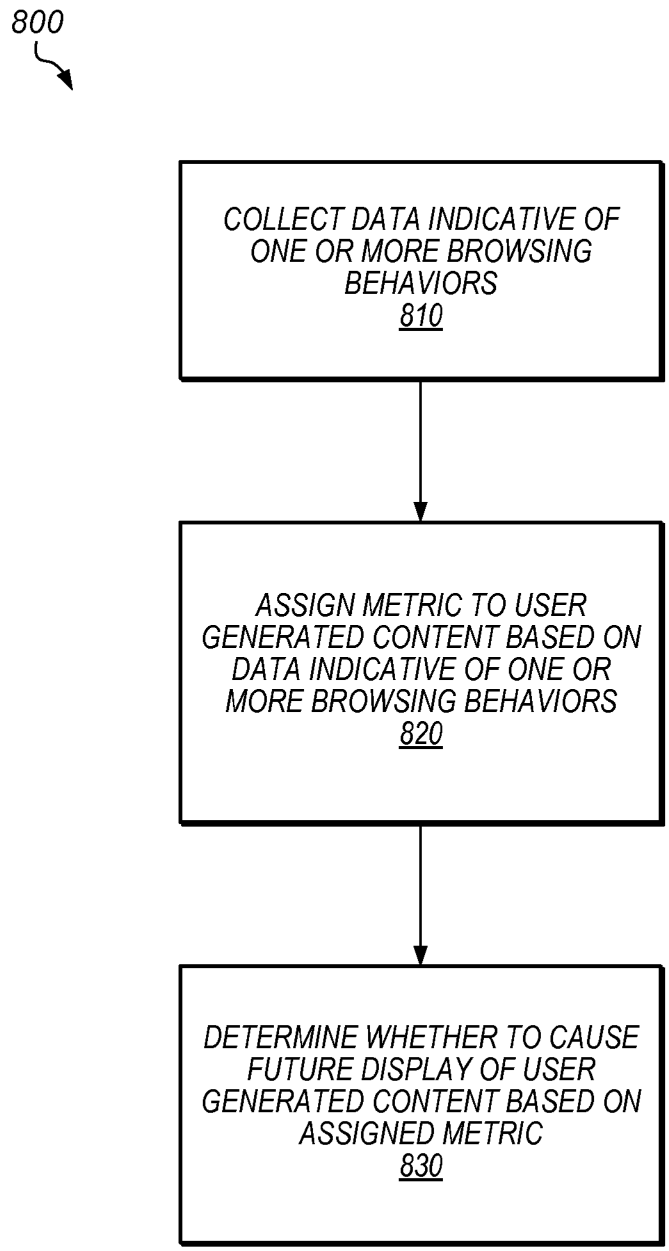
FIG. 8 is a flow chart of one embodiment of a method that relates to assigning a metric to UGC.

Turning now to FIG. 8, a flow chart of one embodiment of a method 800 related to assigning a metric to UGC is shown. In some embodiments, all steps of method 800 are performed by content system 630, while in other embodiments, one or more portions of method 800 may be performed by another computer system (e.g., provider system 620). In various embodiments, systems other than content system 630 may contribute to performing one or more portions of method 800 by gathering and providing information (even without actually performing a portion of method 800).

In step 810, data is collected that is indicative of one or more browsing behaviors of a plurality of users. As discussed herein, browsing behaviors include, but are not limited to: taking one or more navigational actions, selecting a good or service for purchase (e.g., selecting for immediate purchase, placing in a "shopping cart" for possible later purchase, placing on a "wish list" for further consideration for purchase), completing a purchase, requesting additional information (e.g., submitting an email address to a provider), and/or submitting UGC. In some embodiments, browsing behavior may include taking an action related to a good or service for which particular UGC is displayed, while in other embodiments, browsing behavior may include taking an action related to a different good or service for which UGC is not displayed. Thus, in one embodiment, a first browsing behavior includes purchasing an item on a web page that includes UGC for that item (e.g., corresponding to purchasing an item after considering UGC relating to that item), while a second browsing behavior includes purchasing a different item (e.g., corresponding considering UGC relating to a particular item and subsequently purchasing a competing or other item instead), and may also include the user navigating to another web page or web site.

As used herein, the term navigational action includes, but is not limited to, closing a web page, opening a web page, going to a different web site or another part of the same website, and taking other actions that cause a user to be presented with different content. In some embodiments, navigating to a particular web site or one of a group of websites (or web page or one of a group of web pages) may be classified as its own browsing behavior. For example, a user browsing WALMART.COM may be said, in one embodiment, to engage in a first browsing behavior if that user navigates to similar retail sites such as TARGET.COM or KMART.COM, but is said to engage in a different browsing behavior if the user navigates to a site such as NYTIMES.COM (which is not considered to be a direct competitor in this example). Note that in various embodiments, navigational actions are not limited to actions taken within a web browser.

The phrase "collecting data indicative of one or more browsing behaviors of a plurality of users," as used herein, includes collecting data for a first user that engages in a first browsing behavior and collecting data for a second user that engages in a second browsing behavior (which may or may not be the same as the first behavior). This does not imply, however, that first and second users would be engaging in the same browsing behavior together simultaneously or using a same computing device, for example. Instead, the phrase "data indicative of one or more browsing behaviors of a plurality of users" indicates that each of the plurality of users may separately engage in different instances of the same browsing behavior, or engage in different instances of different browsing behaviors, in various embodiments.

In the embodiment of FIG. 8, browsing behaviors for which data are collected may relate to display of UGC that is associated with a person's experience with a particular good or service. Accordingly, one embodiment of step 810 may include collecting first and second data related to first and second instances of UGC being displayed. In other words, the phrase "one or more browsing behaviors, where each of the browsing behaviors relates to display of UGC" does not indicate that each browsing behavior is limited to being related to only one particular instance of the UGC being displayed (e.g., on one user's computing device 602), but rather, that a browsing behavior may relate to any number of different users and/or different viewings of UGC, in various embodiments.

In step 820, a metric is assigned to UGC based on data indicative of one or more browsing behaviors of a plurality of users. In some embodiments, the metric assigned in step 820 may have any or all of the characteristics, functionality, or features of an "importance metric" and/or "impact metric" as discussed herein (e.g., relative to FIG. 1, FIG. 2, and/or other locations). In some embodiments, an assigned metric comprises one or more numeric values. In other embodiments, an assigned metric may be qualitative (e.g., "excellent", "good", "poor") or a binary true/false value. In some embodiments, however, qualitative values and binary true/false values may be determined (or inferred) from stored numeric values (e.g., a value greater than 0.0 may represent "true" for some condition while a value of 0.0 or less may represent "false", a value of 0.8 to 1.0 may represent "excellent" or "four out of five stars", etc.). Note that metrics and metric values are not limited to the examples above, however, and may use different numeric ranges, correspond to other qualitative values, utilize other types of stored values (e.g., such as strings), etc.

In the embodiment of FIG. 8, the metric assigned in step 820 is indicative of an extent to which particular UGC is associated with a first one of one or more browsing behaviors. To give one example, assume that particular UGC is displayed 5,000 times to different users, and the different users subsequently make 150 purchases that include an item. This data indicates the particular UGC is associated with a purchase rate of 3% (150/5000).

However, it may be the case that users generally only purchase that item at a 1.5% rate (e.g., in the absence of the particular UGC, or when given randomly selected UGC). In this example, the 3% purchase rate may indicate that a given user is twice as likely to purchase the item if the particular UGC is displayed to the given user. This may indicate that the particular UGC is more important (and/or more valuable to an owner of provider system 620) than other UGC, in one embodiment.

Thus, a metric that is assigned to particular UGC may include a numeric value indicative of an extent to which the particular UGC is associated with a specific browsing behavior, such as making a purchase. The numeric value included in the metric may be calculated or determined in a variety of ways. (For example, a decimal value of 0.03 could be used (indicating a raw percentage), or a value of 2.0 could be used (indicating the particular UGC is twice as likely to cause the "purchase" browsing behavior as randomly selected or average UGC). However, assigned values are not limited to these examples. A metric assigned to UGC may include a plurality of values in some embodiments, and in some embodiments, two or more metrics may be assigned to the same UGC (e.g., relative to different browsing behaviors). A metric may thus include two or more values that are indicative of extents to which the UGC is respectively associated with two or more different browsing behaviors.

The term "indicative of an extent to which particular UGC is associated with a first browsing behavior" refers, in one embodiment, to the strength of an association between the particular UGC and the behavior. For example, if a plurality of users are presumed to have all viewed particular UGC, some, all, or none of those users may subsequently exhibit a first browsing behavior. A metric for the particular UGC may therefore indicate how strongly that UGC is associated with the first browsing behavior occurring.

In some embodiments, positive or negatively associated browsing behavior may be used to assign a metric to UGC. For example, in one embodiment, a metric may be based on an association of particular UGC with one or more negative browsing behaviors (e.g., behaviors indicating a negative perception of a considered product) that include but are not limited to closing a web page, navigating away from a web page or web site, removing a good or service from a shopping cart, etc. In another embodiment, a metric may be based on an association of particular UGC with one or more positive browsing behaviors (e.g., behaviors indicating a positive perception of a considered product) that include but are not limited to purchasing a good or service, providing contact information, placing a good or service in a shopping cart, requesting additional information or detail on a good or service, etc.

Visibility (or detectability) may affect a metric assigned to particular UGC. In one embodiment, assigning a metric to UGC is based on the UGC being visible to individual users for at least a threshold amount of time. For example, if UGC appears on a user computing device 602 for only a short time, a subsequent browsing behavior (such as closing a web browser window) may not actually be based on the user's perception of that UGC (e.g., the time period that the UGC was visible may be insufficient for reading the UGC). Accordingly, in one embodiment, a particular user's browsing behavior is given no weight when assigning a metric to the UGC if a threshold amount of time (e.g., 3 or 4 or 5 seconds) has not elapsed since the UGC became visible (or detectable, in the case of auditory, tactile, or olfactory UGC) to that user.

Determining whether particular UGC is visible (detectable) may also be based on whether a user has had the opportunity to experience (view) a sufficient portion of the UGC. For example, if a user is viewing a web site, but only a small portion of particular UGC is visible (e.g., only the first two lines of a 15 line review), a subsequent browsing behavior engaged in by the user may not actually be based on that user's perception of the UGC. Accordingly, in one embodiment, a metric is assigned to UGC based on at least a threshold portion of the UGC being visible to individual users. (What constitutes a "threshold portion" of UGC may vary by embodiment, but may include a third, a half, two-thirds, an entirety, etc.) If a threshold portion of UGC is not visible to a user, in one embodiment, that user's subsequent browsing behavior will be given no weight in assigning a metric for the UGC.

Determining whether a user has viewed particular UGC, and for how long, may be performed by user computing device 602 in some embodiments. For example, a user computing device may determine whether UGC is visible to a user on a display screen such a monitor. A web browser may execute Javascript, PHP, or other code or script to determine if particular UGC is in view. In one embodiment, once a threshold portion of UGC becomes visible, a timer begins to run for that UGC and measures how long the UGC remains visible. (In some embodiments, timer values and/or other information for one or more pieces of UGC are periodically reported by user computing device 602 to content system 630, for example, every 0.1 seconds, 0.5 seconds, 1.0 seconds, etc., while in other embodiments, such reporting may be based on an event occurring, such as selecting a link within a page, bringing another tab or window to the forefront, closing a page, etc.) In some embodiments, a system clock may be referenced upon each change in display state in order to measure how long the UGC remains visible.

In assigning a metric to UGC, different users may have different weighting given to their respective browsing behaviors. For example, a first user that is displayed UGC for 25 seconds may have spent a longer time viewing that UGC than a second user for whom the UGC is displayed for only 6 seconds. Thus, a subsequent browsing behavior engaged in by the first user may be based on the UGC to a greater extent than a subsequent browsing behavior of the second user. Accordingly, in assigning a metric for the UGC, one or more browsing behaviors engaged in by a first user may be given a greater weight (i.e., importance value) than one or more browsing behaviors engaged in by a second user. In some embodiments, however, the length of time that UGC is visible may decrease its weight or cause it to not be factored in assigning a metric to the UGC. For example, if a long period of time elapses in which a user's display remains stationary and no input is received, this may indicate that the user is not actively viewing the UGC or is otherwise occupied (away from the screen, talking to someone else, etc.). Accordingly, in one embodiment, once a threshold amount of time has been reached (e.g., 2 minutes), the user may be "timed out" and a timer for the UGC may be fixed at a max amount or may be reset to zero. The timer may resume once additional user input is received that indicates the user is again actively using computing device 602 in this embodiment In another embodiment, assigning a metric to UGC may be based on that UGC's location in display window 710. For example, consider a display window with first, second, and third items of UGC being fully visible, listed top to bottom. In some embodiments, it may be unclear which of the UGC a user is responding to when exhibiting a particular browsing behavior. In one embodiment, all three pieces of UGC are weighted equally—that is, metrics for the first, second, and third UGC may be affected similarly. However, in another embodiment, greater weighting is given to the first UGC, as it appears on the top of display window 710 and is therefore more prominent. In such an embodiment, relative weighting factors like 1.0, 0.7, and 0.4 might be respectively applied to the determination of metrics for the first, second, and third UGC to reflect the fact that UGC that is located further down on a web page is less likely to be read. In some embodiments, scrolling behavior may be informative as to which portion of UGC is being read. For example, scrolling such that UGC previously at the bottom of a page moves upwards may in some cases be indicative that the reader is now reading the UGC that first appeared on the lower portion of a page. In other words, in some embodiments, weighting factors based on screen position may be affected by a current and/or former screen positions for UGC.

In another embodiment, scrolling (back) up to a portion of a display window that includes UGC may cause a metric for that UGC to be given greater weight based on the particular behavior. For example, consider a user that views first UGC, but then scrolls down to view additional content, pushing the first UGC out of a visible area. After, the user scrolls back up (or otherwise navigates back) to the first UGC before making a purchase. The fact that the first UGC was viewed not once, but twice (in two separate time intervals), may be recorded and used to determine a metric reflecting the fact that the first UGC may have been more influential than if it was viewed only a single time.

Determining the value of a metric to be assigned may be based on other factors or information, and is not limited to the above examples. The presence or absence of keywords in UGC, for example (such as "awesome," "great," "terrible," "bad," "problem," "defective," a name of a competitor or competitor's product, etc.) may affect a metric that is assigned to UGC. In other cases, recency may be used to weight UGC when assigning a metric (e.g., more recently generated UGC may be considered more heavily than older UGC when calculating or re-calculating a metric value).

Note that in some embodiments, a metric assigned to UGC may relate to an impact value of a piece of UGC that is computed by determining the total number of times that particular piece of UGC was read (i.e., viewed), as well as the number of times reading the piece of UGC was associated with a purchase transaction (or some other browsing behavior). In one example, this latter number may be divided by the former to arrive at a percentage of "reads" that are converted to purchases. In another embodiment, the impact of UGC can be computed as follows:

$$\text{Impact}=(a+b+c)/(a+b+c+d+e+f),\ \text{where}$$

- a is the total number of transacting scan "reads" (i.e., a review was viewed by a user who purchased for 0 to 4 seconds, or some other interval),
- b is the total number of transacting moderate reads (i.e., a review was viewed by a user who purchased for 4 to 20 seconds, or some other interval),
- c is the total number of transacting deep reads (i.e., a review was viewed by a user who purchased for 20 to 60 seconds, or some other interval),
- d is the total number of non-transacting scan reads (i.e., a review was viewed by a user who did not purchase for 0 to 4 seconds, or some other interval),
- e is the total number of non-transacting moderate reads (i.e., a review was viewed by a user who did not purchase for 4 to 20 seconds, or some other interval), and
- f is the total number of non-transacting deep reads (i.e., a review was viewed by a user who did not purchase for 20 to 60 seconds, or some other interval).

In one embodiment, "transacting" reads, are reads that resulted in a purchase transaction, while "non-transacting"

reads are those which did not result in a purchase transaction. Computed impact values can be used to compute a normalized influence score for each review over a given time period in some embodiments:

$$\text{Influence}=(\text{impact}-\text{min\_impact}+0.000001)/(\text{max\_impact}-\text{min\_impact}+0.000001)*100,$$

where min_impact is the minimum impact score of a review on that product, and max_impact is the maximum impact score of a review on that product. Such a calculation, in one or more embodiments, can be done for products in specific categories, sub-categories, or other product sets. Calculations can also be extended to a personalized framework by limiting a calculation of the score to a set of users similar to a given user (as defined by some user-to-user metric space), in one embodiment. A computation may use a cut-off for a minimum number of review reads in order to alleviate an imbalance in review impressions which may result from the fact that content which is first presented to a user (e.g. near the top of a series of reviews) is typically consumed the most, in some embodiments.

Impact data can be used by a provider (e.g., a retailer) for various purposes. For instance, UGC that is most likely to result in a purchase transaction may be placed in the position that is most likely to be viewed by a user (e.g., in the first position of a series of reviews). It should also be noted that the read times associated with particular user generated content items may also be used more directly. For example, if a particular user generated content item is one which users often spend a significant amount of time reading, it may benefit the retailer to place other content items near this user generated content item in order to increase the likelihood that they will also be given a significant amount of attention by the user. Advertisements, for instance, may be more effective if they are positioned adjacent to and are viewable along with user generated content items that have higher read times. Additionally, content identified as highly engaging to a specific user segment can be selected as valuable content to be included in external advertisements created either directly by the provider or by a third-party on their behalf.

In the embodiment of FIG. 8, step 830 includes a computer system determining whether to cause future display of particular UGC based, at least in part, on an assigned metric for the particular UGC. For example, a product page on a retail website such as BESTBUY.COM may have between one and three pieces of UGC displayed that relate to the product. It would be advantageous to include UGC that, based on one or more assigned metrics, may be more helpful to users, likelier to lead to a purchase (e.g., of the particular product or to a different product), etc. Accordingly, in some embodiments, a computer system may cause future display of particular UGC by causing the UGC to be included in a web page (which may be dynamically generated in response to a request from a user and/or from provider system 620, for example).

Figure 9:
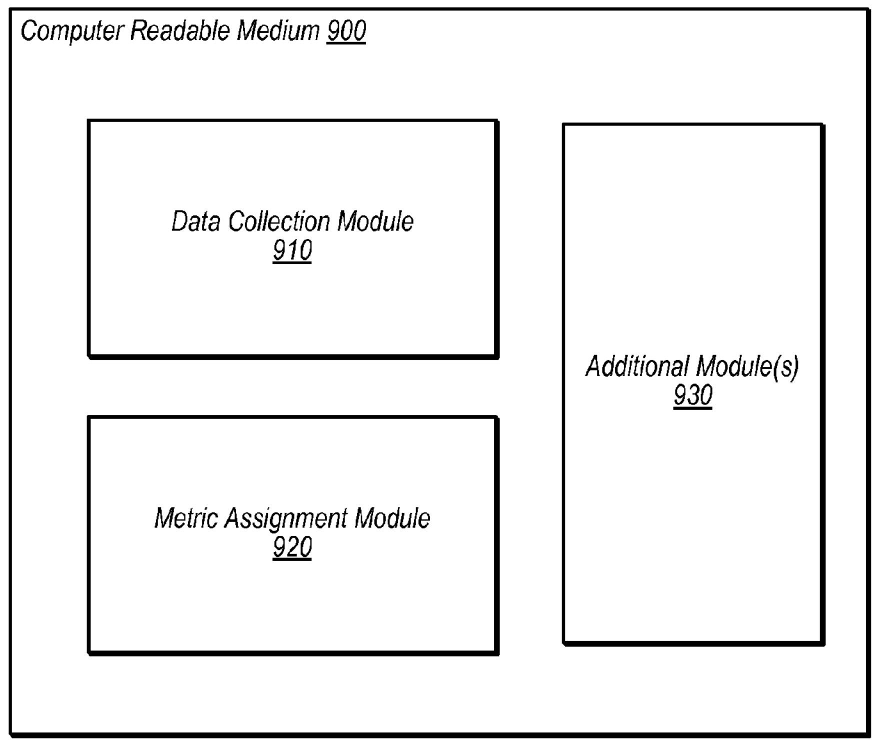
FIG. 9 is a diagram illustrating one embodiment of a computer readable storage medium.

Turning now to FIG. 9, computer readable storage medium 900 is shown. In various embodiments, any or all of the modules (or a portion thereof) in medium 900 can be present in any computer system or computing device described herein (e.g., such as content system 630 or provider system 620). As shown, computer readable storage medium 900 includes a data collection module 910 and a metric assignment module 920. In some embodiments, one or more additional modules 930 may also be present, which may be executed to cause one or more additional steps to be performed. In general, any steps, details, characteristics, or features described relative to method 800 and/or computer readable medium 900 may be suitably combined as consistent with this disclosure in various embodiments.

As shown, module 910 includes instructions that are executable to cause a computer system to collect data indicative of one or more browsing behaviors of a plurality of users, wherein each of the one or more browsing behaviors relates to display of UGC, where the UGC is associated with a first person's experience with a particular good or service. This collecting of data may, in various embodiments, include any or all features of step 810 of method 800. In one embodiment, module 910 is configured to collect data by causing a computer system to receive the data from another computer system (that is, the term "collecting data" does not imply that data cannot be acquired from another source).

Module 920 includes instructions that are executable, in the embodiment of FIG. 9 to cause a computer system to assign a metric to UGC based on data collected by module 910. In some embodiments, this assigned metric is indicative of an extent to which UGC is associated with a first one of one or more browsing behaviors of a plurality of users. In one embodiment, the metric assigned by module 920 is indicative of whether UGC should be included in one or more web pages (which may be dynamically generated) that are associated with one or more particular goods or services. Thus, in some embodiments, UGC corresponding to a first product is included on a page related to the first product, while in other embodiments, UGC may be included on a page related to a different product.

In one embodiment, module 930 includes instructions executable to cause a computer system to access demographic information associated with a plurality of users and assign a metric to UGC based on the demographic information. As used herein, the term "demographic information" may include, but is not limited to, information relating to geographical region, age, gender, purchasing behaviors, educational level, industry, profession, or career, etc. For example, it may be the case that particular UGC is more effective at creating purchases for people from a same area as the user that authored the UGC or in a same age bracket (e.g., 18-24). In such cases, it may be advantageous to use metrics based on demographic information in order to determine whether to cause display of the UGC to another user. For example, if a user is male, from the state of Texas, and is 40-49 years old, any or all of that information might be used in order to determine what UGC should be included in a particular location (e.g., a prominent location) of a dynamically generated web page. Note that the use of demographic information is not limited to the examples above, however.

In another embodiment, module 930 includes instructions executable to cause a computer system to associate an account of a first person with a particular status, which may correspond to one or more qualities associated with that account. For example, a person may use an account to leave a number of reviews for products or services. If these reviews, as a group, are strongly indicated by their assigned metrics as being helpful, influential, likely to lead to purchase, etc., an account (and/or person) may itself be used as a basis for assigning other metrics. Thus, if a person's account is indicated as having a particular status related to UGC generated by that person, metrics assigned to future UGC generated by that person using that account may be adjusted by one or more positive or negative values. Likewise, a reviewer that is particularly unhelpful or tends to drive users away from making a purchase may have his account associated with a negative status that may make future UGC from that reviewer less likely to be shown to other users.

In yet another embodiment, module 930 includes instructions that are executable to cause a computer system to alert a provider of a good or service based on one or more metrics assigned to one or more items of UGC. For example, consider one or more pieces of UGC that mention a problem with a good or service, and have associated metrics indicating that users who view that UGC are likely to engage in one or more negative browsing behaviors. A sufficiently poor metric value may, in one embodiment, trigger content system 130 to send an alert (e.g., an email, phone call, etc.) to a provider, who may then investigate whether a potential problem exists (e.g., an underlying manufacturing or design defect).

Exemplary Computer System

Figure 10:
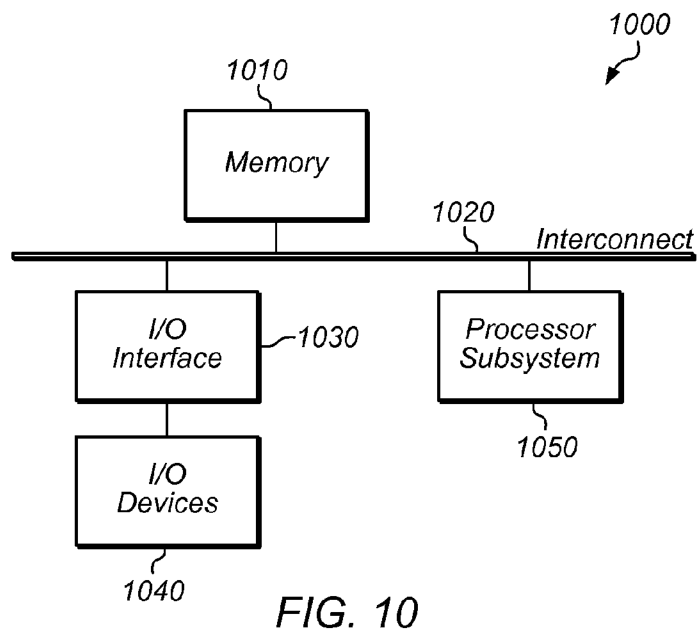
FIG. 10 is a diagram illustrating one embodiment of an exemplary computer system.

Turning now to FIG. 10, one embodiment of an exemplary computer system 1000 is depicted. Computer system 1000 includes a processor subsystem 1050 that is coupled to a system memory 1010 and I/O interfaces(s) 1030 via an interconnect 1020 (e.g., a system bus). I/O interface(s) 1030 are coupled to one or more I/O devices 1040. Computer system 1000 may be any of various types of devices, including, but not limited to, a server system, personal computer system, desktop computer, laptop or notebook computer, mainframe computer system, handheld computer, workstation, network computer, or a device such as a mobile phone, pager, or personal data assistant (PDA). Computer system 1000 may also be any type of networked peripheral device such as storage devices, switches, modems, routers, etc. Although a single computer system 1000 is shown for convenience, the system may also be implemented as two or more computer systems operating together.

Processor subsystem 1050 may include one or more processors or processing units. In various embodiments of computer system 1000, multiple instances of the processor subsystem may be coupled to interconnect 1020. In various embodiments, processor subsystem 1050 (or each processor unit within the subsystem) may contain a cache or other form of on-board memory. In one embodiment, processor subsystem 1050 may include one or more processors.

System memory 1010 is usable by processor subsystem 1050. System memory 1010 may be implemented using different physical memory media, such as hard disk storage, floppy disk storage, removable disk storage, flash memory, random access memory (RAM—SRAM, EDO RAM, SDRAM, DDR SDRAM, RDRAM, etc.), read only memory (PROM, EEPROM, etc.), and so on. Memory in computer system 1000 is not limited to primary storage. Rather, computer system 1000 may also include other forms of storage such as cache memory in processor subsystem 1050 and secondary storage on the I/O Devices 1040 (e.g., a hard drive, storage array, etc.). In some embodiments, these other forms of storage may also store program instructions executable by processor subsystem 1050.

I/O interfaces 1030 may be any of various types of interfaces configured to couple to and communicate with other devices, according to various embodiments. In one embodiment, I/O interface 1030 is a bridge chip (e.g., Southbridge) from a front-side to one or more back-side buses. I/O interfaces 1030 may be coupled to one or more I/O devices 1040 via one or more corresponding buses or other interfaces. Examples of I/O devices 1040 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device. The network interface device may be a wireless interface in various embodiments. In other embodiments, computer system 1000 is part of a cloud-based computing service. In general, the present disclosure is not limited to any particular type of computer architecture.

Computer-Readable Medium

The above-described techniques and methods may be implemented as computer-readable instructions stored on any suitable computer-readable storage medium (such as medium 900). As used herein, the term computer-readable storage medium refers to a (nontransitory, tangible) medium that is readable by a computing device or computer system, and includes magnetic, optical, and solid-state storage media such as hard drives, optical disks, DVDs, volatile or nonvolatile RAM devices, holographic storage, programmable memory, etc. The term "non-transitory" as applied to computer-readable media herein is only intended to exclude from claim scope any subject matter that is deemed to be ineligible under 35 U.S.C. §101, such as transitory (intangible) media (e.g., carrier waves per se), and is not intended to exclude any subject matter otherwise considered to be statutory. Computer-readable storage mediums can be used, in various embodiments, to store executable instructions and/or data. In some embodiments, particular functionality may be implemented by one or more software "modules". A software module may include one or more executable files, web applications, and/or other files, and in some embodiments, and may make use of PHP, JAVASCIPT, HTML, Objective-C, JAVA, or any other suitable technology. In various embodiments, software functionality may be split across one or more modules and/or may be implemented using parallel computing techniques, while in other embodiments various software functionality may be combined in single modules. Software functionality may be implemented and/or stored on two or more computer systems (e.g., a server farm, or a front-end server and a back-end server and/or other computing systems and/or devices) in various embodiments.

LISTING OF SELECTED EMBODIMENTS

The following embodiment listings are provided in accordance with structures and techniques described herein:

Embodiment 1

A method, comprising:

a computer system collecting data indicative of one or more browsing behaviors of a plurality of users, wherein each of the one or more browsing behaviors relates to display of user generated content (UGC), wherein the UGC is associated with a particular person's experience with a particular good or service; and the computer system assigning a metric to the UGC based on the data indicative of the one or more browsing behaviors of the plurality of users, wherein the metric is indicative of an extent to which the UGC is associated with a first one of the one or more browsing behaviors.

Embodiment 2

The method of embodiment 1, further comprising the computer system determining whether to cause future display of the UGC based, at least in part, on the assigned metric.

Embodiment 3

The method of embodiment 1, wherein the one or more browsing behaviors include a navigational action taken by one or more of the plurality of users, wherein the metric is indicative of an extent to which individual ones of the plurality of users took the navigational action.

Embodiment 4

The method of embodiment 1, wherein the UGC includes a review of the particular good or service by the particular person.

Embodiment 5

The method of embodiment 1, wherein assigning the metric to the UGC is based on two or more browsing behaviors, including at least one negatively associated browsing behavior.

Embodiment 6

The method of embodiment 1, wherein assigning the metric to the UGC is based on at least one positively associated browsing behavior.

Embodiment 7

The method of embodiment 1, wherein assigning the metric to the UGC is based on the UGC being visible to individual ones of the plurality of users for at least a threshold amount of time.

Embodiment 8

The method of embodiment 1, wherein assigning the metric to the UGC is based on at least a threshold portion of the UGC being visible to individual ones of the plurality of users.

Embodiment 9

The method of embodiment 1, wherein assigning the metric comprises using a larger importance value for a first user performing a first one of the one or more browsing behaviors than an importance value for a second user performing a second one of the one or more browsing behaviors.

Embodiment 10

The method of embodiment 1, wherein the one or more browsing behaviors include purchasing the particular good or service.

Embodiment 11

A computer readable storage medium having stored thereon instructions that are executable by a computing device to cause the computing device to perform operations comprising:

collecting data indicative of one or more browsing behaviors of a plurality of users, wherein each of the one or more browsing behaviors relates to display of user generated content (UGC), wherein the UGC is associated with a particular person's experience with a particular good or service; and assigning a metric to the UGC based on the data indicative of the one or more browsing behaviors of the plurality of users, wherein the metric is indicative of an extent to which the UGC is associated with a first one of the one or more browsing behaviors.

Embodiment 12

The computer readable storage medium of embodiment 11, wherein the operations further comprise:

based on the assigned metric, causing the UGC to be included in a dynamically generated web page associated with the particular good or service.

Embodiment 13

The computer readable storage medium of embodiment 11, wherein the operations further comprise:

accessing demographic information associated with the plurality of users;

wherein the assigning the metric to the UGC is based on the demographic information.

Embodiment 14

The computer readable storage medium of embodiment 11, wherein the operations further comprise calculating one or more numeric values based on the one or more browsing behaviors, wherein the assigned metric includes the one or more calculated numeric values.

Embodiment 15

The computer readable storage medium of embodiment 11, wherein collecting the data indicative of the plurality of browsing behaviors comprises receiving said data from another computer system.

Embodiment 16

A computer system, comprising:

a processor; and a computer readable storage medium having stored thereon instructions that are executable by the computer system, using the processor, to cause the computer system to perform operations comprising:

- collecting data indicative of one or more browsing behaviors of a plurality of users, wherein each of the one or more browsing behaviors corresponds to one or more respective actions taken by individual ones of the plurality of users subsequent to the individual ones of the plurality of users being presented with first user generated content (UGC), wherein the first UGC is associated with a particular person's experience with a particular good or service; and
- assigning a metric to the first UGC based on the data indicative of the one or more browsing behaviors of the plurality of users, wherein the metric is indicative of an extent to which the first UGC is associated with a first one of the one or more browsing behaviors.

Embodiment 17

The computer system of embodiment 16, wherein the operations further comprise:

accessing a plurality of metrics assigned to a plurality of UGC that includes the first UGC, wherein the plurality of UGC is associated with respective personal experiences with the particular good or service;

determining, based on the assigned plurality of metrics, that a particular one of the UGC should be included in a web page related to the particular good or service; and based on said determining, transmitting the particular UGC to a second computer system that is configured to cause the particular UGC to be presented in the web page related to one or more particular goods or services.

Embodiment 18

The computer system of embodiment 16, wherein the operations further comprise:

based on the assigned metric, associating an account of the particular person with a particular status; and based on the particular status, assigning a second metric to second UGC generated by the account of the particular person, wherein the second UGC is for a different good or service.

Embodiment 19

The computer system of embodiment 16, wherein the operations further comprise:

based on a value of the assigned metric, transmitting an alert to a provider of the particular good or service.

Embodiment 20

The computer system of embodiment 16, wherein the one or more respective actions taken by individual ones of the plurality of users include navigating, within a web browser, away from a web page related to the particular good or service.

Although specific embodiments have been described herein, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Additionally, section or heading titles provided above in the detailed description should not be construed as limiting the disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:

a computer system receiving data from tracking code injected in a web page of a first web site loaded by a web browser of a user computer, wherein the tracking code is executable to individually track visibility of a plurality of distinct items of user generated content (UGC) that are part of the web page, wherein the UGC describes experiences with one or more particular goods or services, and wherein the received data relates to individual amounts of time that each of the plurality of distinct items of UGC is visible on a display of the user computer;

based on the received data, the computer system assigning a plurality of numeric impact metric values that each correspond to a respective one of the plurality of distinct items of UGC, wherein ones of the plurality of numeric impact metric values are based at least in part on the amounts of time that the plurality of distinct items of UGC were visible on the user computer, and wherein each numeric impact metric value is further based in part on whether the corresponding one of the plurality of distinct items of UGC was associated with a purchase transaction, and wherein the assigning includes:

determining that an amount of time that a particular one of the plurality of distinct items of UGC was visible exceeded a threshold amount; and in response to the determining, precluding the amount of time from an assignment of a numeric impact metric value of the particular distinct item of UGC;

the computer system receiving a request for UGC from a second, different web site; and the computer system determining whether to provide one or more of the plurality of distinct items of UGC to the second web site for display, wherein the determining is based, at least in part, on the plurality of numeric impact metric values.

2. The method of claim 1, wherein the UGC includes personal reviews of at least one of the one or more particular goods or services.

3. The method of claim 1, wherein assigning the plurality of numeric impact metric values is based at least in part on two or more browsing behaviors, including at least one negatively associated browsing behavior.

4. The method of claim 1, wherein assigning the plurality of numeric impact metric values one or more metrics is based at least in part on at least one positively associated browsing behavior.

5. The method of claim 1, wherein assigning a particular metric value to another particular one of the distinct items of UGC is based at least in part on the other particular item of UGC being visible on the display of the user computer for at least a threshold amount of time.

6. The method of claim 1, wherein assigning a particular metric value to a particular another one of the distinct items of UGC is based at least in part on at least a threshold portion of the other particular item of UGC being visible on the display of the user computer.

7. The method of claim 1, further comprising the computer system determining whether to cause future display of one or more of the plurality of distinct items of UGC based, at least in part, whether a purchase of a particular good or service was made via the web page.

8. A computer readable storage medium having stored thereon instructions that are executable by a computing device to cause the computing device to perform operations comprising:

receiving data from tracking code injected in a web page of a webpage of a first web site loaded by a web browser of a user computer, wherein the tracking code is executable to individually track visibility of a plurality of distinct items of user generated content (UGC) that are part of the web page, wherein the UGC describes experiences with one or more particular goods or services, and wherein the received data relates to individual amounts of time that each of the plurality of distinct items of UGC is visible within a specific area of the web browser;

based on the received data, assigning a plurality of numeric impact metric values that each correspond to a respective one of the plurality of distinct items of UGC, wherein ones of the plurality of numeric impact metric values are based at least in part on the amounts of time that the plurality of distinct items of UGC were visible on the user computer, and wherein each numeric impact metric value is further based in part on whether the corresponding one of the plurality of distinct items of UGC was associated with a purchase transaction, and wherein the assigning includes:

determining that an amount of time that a particular one of the plurality of distinct items of UGC was visible exceeded a threshold amount; and in response to the determining, precluding the amount of time from an assignment of a numeric impact metric value of the particular distinct item of UGC;

receiving a request for UGC from a second, different web site; and determining whether to provide one or more of the plurality of distinct items of UGC to the second web site for display, wherein the determining based, at least in part, on the plurality of numeric impact metric values.

9. The computer readable storage medium of claim 8, wherein the operations further comprise:

based at least in part on a particular one of the assigned plurality of numeric impact metric values, causing a particular item of the UGC to be included in a dynamically generated web page associated with a specific one of the one or more particular goods or services.

10. The computer readable storage medium of claim 8, wherein the operations further comprise:

accessing demographic information associated with a user of the web browser; and wherein the assigning the plurality of numeric impact metric values is based at least in part on the demographic information.

11. The computer readable storage medium of claim 8, wherein the operations further comprise calculating one or more numeric values based at least in part on one or more browsing behaviors within the web browser, wherein the assigned plurality of numeric impact metric values include the one or more calculated numeric values.

12. A computer system, comprising:

a processor; and a computer readable storage medium having stored thereon instructions that are executable by the computer system, using the processor, to cause the computer system to perform operations comprising:

receiving data from tracking code injected in a web page of a first web site rendered by a web browser of a user computer, wherein the tracking code is executable to individually track visibility of a plurality of distinct items of user generated content (UGC) that are part of the web page, wherein the UGC describes experiences with one or more particular goods or services, and wherein the received data relates to a first amount of time that a first one of the plurality of distinct items of UGC is visible on a display of the user computer and a second amount of time that a second one of the plurality of distinct items of UGC is visible on the display;

based on the received data, assigning a first numeric impact metric to the first item of UGC based at least in part on the first amount of time that the first item of UGC was visible on the user computer, and wherein the first numeric impact metric is based further in part on whether the first item of UGC was associated with a purchase transaction;

based on the received data, assigning a second numeric impact metric to second item of UGC, wherein assigning the second numeric impact metric includes:

determining that the second amount of time that the second item of UGC was visible exceeded a threshold amount; and in response to the determining, precluding the second amount of time from an assignment of the second numeric impact metric;

receiving a request for UGC from a second, different web site; and determining whether to provide the first and second items of UGC to the second web site for display, wherein the determining is based, at least in part, on the assigned first and second numeric impact metrics for the first and second items of UGC.

13. The computer system of claim 12, wherein the operations further comprise:

determining, based at least in part on the assigned first numeric impact metric, that the first item of UGC should be included in a particular web page related to a particular good or service; and based at least in part on said determining to include the first item of UGC, transmitting the particular item of UGC to a second computer system that is configured to cause the first item of UGC to be presented in the particular web page.

14. The computer system of claim 12, wherein the operations further comprise:

based at least in part on the assigned first numeric impact metric, associating an account of a submitter of the first item of UGC with a particular status; and based at least in part on the particular status, assigning a different numeric impact metric to a different item of UGC generated by the account of the submitter, wherein the different item of UGC is for a different good or service than a good or service to which the first item of UGC relates.

15. The computer system of claim 12, wherein the operations further comprise:

based at least in part on a value of the assigned first numeric impact metric, transmitting an alert to a provider of a particular good or service to which the first item of UGC relates.

16. The computer system of claim 12, wherein assigning the first numeric impact metric is based at least in part on a user of the web browser navigating, within the web browser, away from a web page corresponding to a particular good or service.

* * * * *